US012806903B2

(12) United States Patent
Furuzawa et al.

(10) Patent No.: US 12,806,903 B2
(45) Date of Patent: Nov. 24, 2026

(54) LIQUID DISCHARGE HEAD AND LIQUID DISCHARGE DEVICE

(71) Applicant: KYOCERA CORPORATION, Kyoto (JP)

(72) Inventors: Daiki Furuzawa, Kagoshima (JP); Kensei Tanaka, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 138 days.

(21) Appl. No.: 18/878,875

(22) PCT Filed: Jun. 27, 2023

(86) PCT No.: PCT/JP2023/023748
§ 371 (c)(1),
(2) Date: Dec. 25, 2024

(87) PCT Pub. No.: WO2024/004996
PCT Pub. Date: Jan. 4, 2024

(65) Prior Publication Data

US 2025/0388012 A1 Dec. 25, 2025

(30) Foreign Application Priority Data

Jun. 29, 2022 (JP) ................................ 2022-104475

(51) Int. Cl.
*B41J 2/14* (2006.01)
*B41J 2/045* (2006.01)

(52) U.S. Cl.
CPC ....... *B41J 2/14233* (2013.01); *B41J 2/04581* (2013.01); *B41J 2/04588* (2013.01);
(Continued)

(58) Field of Classification Search
CPC ............... B41J 2/14233; B41J 2/04581; B41J 2/04588; B41J 2002/14491; B41J 2202/20; B41J 2202/21
See application file for complete search history.

(56) References Cited

U.S. PATENT DOCUMENTS

2006/0214538 A1* 9/2006 Okuda ................ B41J 2/04588 310/315
2008/0084457 A1 4/2008 Hibi et al.
2021/0060947 A1 3/2021 Kanzaki et al.

FOREIGN PATENT DOCUMENTS

JP 2008-094094 A 4/2008
JP 2021-037692 A 3/2021

* cited by examiner

*Primary Examiner* — Geoffrey S Mruk
(74) *Attorney, Agent, or Firm* — HAUPTMAN HAM, LLP

(57) ABSTRACT

A liquid ejection head includes a flow channel member and an actuator. The flow channel member includes an individual flow channel that accommodates a liquid. The individual flow channel includes a pressurization chamber, a partial flow channel extending from the pressurization chamber, and a nozzle opening to the outside at an end portion of the partial flow channel on the opposite side from the pressurization chamber. The actuator applies pressure to the pressurization chamber. An attenuation rate of a natural vibration (main vibration) of the liquid in the individual flow channel is $\gamma 1$ (rad/s). An angular frequency of the main vibration is $\omega 1$ (rad/s). An angular frequency of a high-frequency vibration is $\omega 2$ (rad/s). n is a positive integer. The following formula is satisfied. $0.95\times 2n(1+0.32\times\gamma 1/\omega 1)\leq\omega 2/\omega 1\leq 1.05\times 2n(1+0.32\times\gamma 1/\omega 1)$.

14 Claims, 13 Drawing Sheets

(52) U.S. Cl.
CPC .. *B41J 2002/14491* (2013.01); *B41J 2202/20* (2013.01); *B41J 2202/21* (2013.01)

LIQUID DISCHARGE HEAD AND LIQUID DISCHARGE DEVICE

RELATED APPLICATIONS

The present application is a National Phase of International Application Number PCT/JP2023/023748 filed Jun. 27, 2023, which claims the benefit of priority from Japanese Patent Application No. 2022-104475, filed on Jun. 29, 2022.

TECHNICAL FIELD

The present disclosure relates to liquid ejection heads such as inkjet heads and liquid ejection devices including such liquid ejection heads.

BACKGROUND OF INVENTION

A known liquid ejection head (for example, an inkjet head) ejects droplets (for example, ink droplets) toward a recording medium (for example, paper) (for example, below-listed Patent Literature 1). Such a liquid ejection head includes, for example, a flow channel member that includes flow channels filled with ink, actuators (for example, piezoelectric elements) that apply pressure to the ink in the flow channel member, and a driver that inputs drive signals to the actuators. The flow channels of the flow channel member include, for example, a common flow channel (sometimes referred to as a manifold) and multiple individual flow channels to which the liquid (for example, ink) is supplied from the common flow channel. The individual flow channels each include, for example, a pressurization chamber (sometimes referred to as a pressure chamber) to which pressure is applied by a corresponding actuator, and a nozzle that is connected to the pressurization chamber and opens to the outside.

In Patent Literature 1, droplets are ejected from the nozzles using a so-called pull-push driving method. In the pull-push method, the volume of the pressurization chamber is increased in order to draw the liquid into the pressurization chamber, and then the volume of the pressurization chamber is decreased in order to push the liquid out, thereby causing a droplet to be ejected from the nozzle. In order to implement the pull-push method, the drive signal input to the actuator has a pulse waveform. The pulse waveform has a fall in signal strength corresponding to the expansion of the volume of the pressurization chamber and a rise in signal strength corresponding to the reduction of the volume of the pressurization chamber. In Patent Literature 1, the length of time from the falling edge to the rising edge is defined as a length AL (μs) that resonates most with the resonance frequency of the liquid in the individual flow channel. By setting the width (time length) of the pulse waveform in this way, for example, the volume of the pressurization chamber can be reduced to push out the liquid in time with the timing at which liquid drawn into the pressurization chamber is reversed towards the nozzle by its own natural vibration. As a result, the ejection velocity of the liquid can be increased.

CITATION LIST

Patent Literature

Patent Literature 1: Japanese Unexamined Patent Application Publication No. 2021-37692

SUMMARY

In an embodiment of the present disclosure, a liquid ejection head includes a flow channel member and an actuator. The flow channel member includes an individual flow channel configured to accommodate a liquid. The individual flow channel includes a pressurization chamber, a partial flow channel, and a nozzle. The partial flow channel extends from the pressurization chamber. The nozzle opens to outside at an end portion of the partial flow channel on an opposite side from the pressurization chamber. The actuator is configured to apply pressure to the pressurization chamber. An attenuation rate of a natural vibration of the liquid in the individual flow channel is γ1 (rad/s). An angular frequency of the natural vibration of the liquid in the individual flow channel is ω1 (rad/s). An angular frequency of the natural vibration of the liquid in the partial flow channel is ω2 (rad/s). n is a positive integer. Here, the following formula is satisfied.

$$0.95\times 2n(1+0.32\times\gamma 1/\omega 1)\leq\omega 2/\omega 1\leq 1.05\times 2n(1+0.32\times\gamma 1/\omega 1)$$

In an embodiment of the present disclosure, a liquid ejection head includes a flow channel member and an actuator. The flow channel member includes an individual flow channel configured to accommodate a liquid. The individual flow channel includes a pressurization chamber, a partial flow channel, and a nozzle. The partial flow channel extends from the pressurization chamber. The nozzle opens to outside at an end portion of the partial flow channel on an opposite side from the pressurization chamber. The actuator is configured to apply pressure to the pressurization chamber. An angular frequency of a natural vibration of the liquid in the individual flow channel is ω1 (rad/s). An angular frequency of the natural vibration of the liquid in the partial flow channel is ω2 (rad/s). Here, the following formula is satisfied.

$$1.97\leq\omega 2/\omega 1\leq 2.39 \text{ or}$$

$$3.95\leq\omega 2/\omega 1\leq 4.88$$

In an embodiment of the present disclosure, a liquid ejection device includes the above-described liquid ejection head and a moving unit configured to move the liquid ejection head and a recording medium relative to each other.

DESCRIPTION OF EMBODIMENTS

Figure 1A:
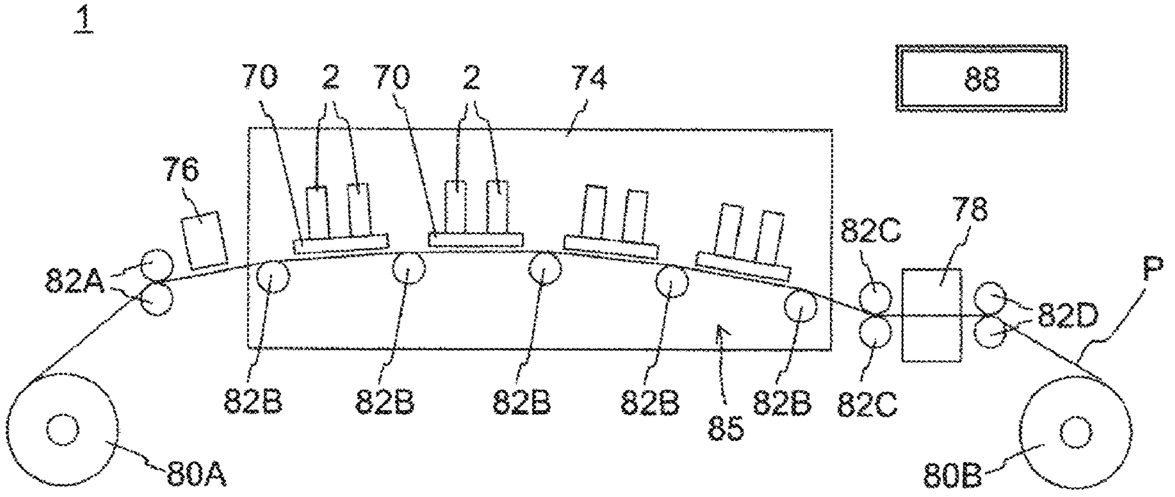
FIG. 1A is a side view schematically illustrating a recording device according to an embodiment.

Hereafter, embodiments according to the present disclosure will be described in detail while referring to the drawings. The drawings used in the following description are schematic drawings. The dimensional ratios and so on in the drawings do not necessarily match the actual dimensional ratios and so on. There may be cases where the dimensional ratios and so on do not match between the drawings. Certain shapes or dimensions may be illustrated in an exaggerated fashion, and details may be omitted. However, this does not deny the possibility that the actual shapes and/or dimensions may be as illustrated in the drawings, or that the shape and/or dimensions may be extracted from the drawings.

Overview of Embodiment

Figure 3:
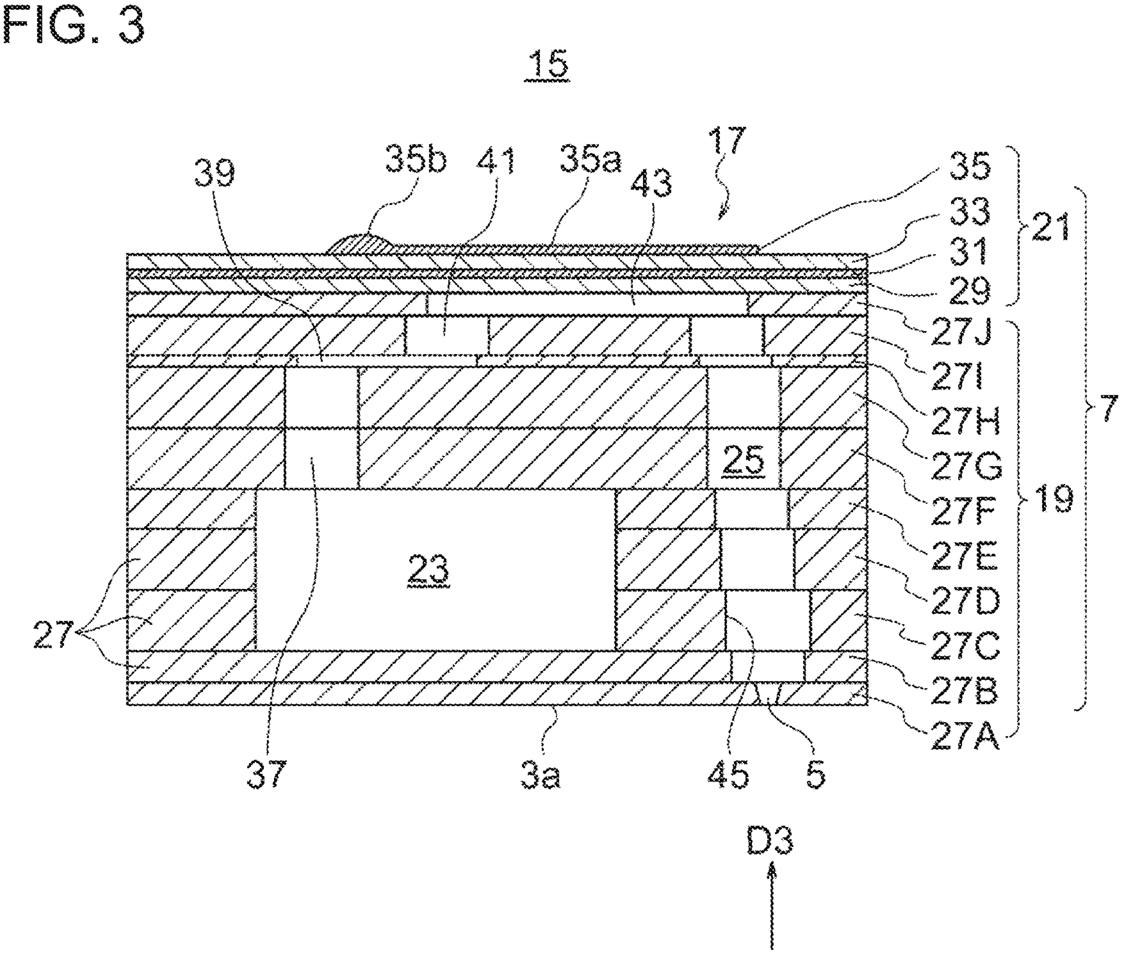
FIG. 3 is a sectional view taken along line III-III in FIG. 2B.

FIG. 3 is a sectional view illustrating part of a liquid ejection head 2 (symbol appears in FIG. 1A. Hereafter, sometimes simply referred to as "head 2") according to an embodiment.

The head 2 includes ejecting elements 15 that eject droplets (for example, ink droplets) downward (−D3 side) in the figure from nozzles 5. In FIG. 3, one ejecting element 15 (one nozzle 5) is illustrated, but the head 2 includes multiple ejecting elements 15 (multiple nozzles 5) along a plane perpendicular to the D3 direction. The ejected droplets, for example, land on a recording medium (paper, for example, not illustrated here) positioned on the −D3 side. As a result, for example, dots making up an image are formed.

The head 2 includes a flow channel member 19 that includes channels filled with a liquid (for example, ink). The ejecting elements 15 include individual flow channels 25 formed in the flow channel member 19. Each individual flow channel 25, for example, includes a pressurization chamber 43, a partial flow channel 45 (sometimes called a "descender") extending from the pressurization chamber 43 toward the −D3 side, and the aforementioned nozzle 5 that opens to the outside at an end portion of the partial flow channel 45 on the −D3 side (opposite side from the pressurization chamber 43).

An actuator 17 (actuator substrate 21) overlaps the +D3 side (upper side in figure) of the pressurization chamber 43. The actuator 17 is capable of undergoing bending deformation on the side where the pressurization chamber 43 is located and/or on the opposite side from the side where the pressurization chamber 43 is located. This bending deformation applies pressure to the liquid inside the pressurization chamber 43. As a result, the nozzle 5 ejects a droplet.

Here, the attenuation rate of the natural vibration (hereafter may be referred to as the "main vibration") of the liquid in the individual flow channel 25 (the entire flow channel) is γ1 (rad/s). An angular frequency of the main vibration is ω1 (rad/s). The angular frequency of the natural vibration (hereafter may be referred to as "high-frequency vibration") of the liquid in the partial flow channel 45 is ω2 (rad/s). n is a positive integer. At this time, the following Formula (1) is satisfied for the individual flow channel 25.

$$0.95\times 2n(1+0.32\times\gamma 1/\omega 1)\leq\omega 2/\omega 1\leq 1.05\times 2n(1+0.32\times\gamma 1/\omega 1)\quad (1)$$

From another perspective, instead of or in addition to Formula (1), the following Formulas (2) and (3) are also satisfied.

$$1.97\leq\omega 2/\omega 1\leq 2.39\quad (2)$$

$$3.95\leq\omega 2/\omega 1\leq 4.88\quad (3)$$

The angular frequencies ω1 and ω2 and the attenuation rate γ1 may be defined as parameters obtained when, for example, a velocity v1(t) of a main vibration and a velocity v2 (t) of a high-frequency vibration are expressed as follows.

$$v1(t)=-A1\times e^{-\gamma 1\times t}\cos(\omega 1\times t)\quad (4)$$

$$v2(t)=-A2\times e^{-\gamma 2\times t}\cos(\omega 2\times t)\quad (5)$$

In the above description, A1 and A2 are maximum amplitudes (m/s). t is time(s). γ2 is the attenuation rate (rad/s) of the high-frequency vibration. In theory, the displacement of the main vibration and high-frequency vibration can also be expressed by formulas the same as or similar to those above, except that the values of the maximum amplitudes and units, as well as the initial phases, will differ. In other words, the attenuation rate and angular frequency are common to the displacement and velocity. Therefore, in the following, when the attenuation rate and angular frequency are referred to, no distinction may be made between displacement and velocity.

In Formulas (1) to (3), both $\gamma 1/\omega 1$ and $\omega 2/\omega 1$ are dimensionless quantities. In addition, in an embodiment, the dimensionless quantity $\gamma 2/\omega 1$ is used. For the sake of convenience, the units of $\gamma 1$, $\gamma 2$, $\omega 1$, and $\omega 2$ may be omitted in the following descriptions.

By satisfying at least one of Formulas (1) to (3), for example, variations in the ejection velocity of droplets between the multiple ejecting elements 15 can be reduced. As a result, for example, the image quality can be improved. The specific principles will be explained later.

An overview of the head 2 according to an embodiment has been given above. Next, a general outline of the head 2 and a printer 1 (example of liquid ejection device) including the head 2 is given in the following order.

1. Overall Configuration of Printer 1 (FIGS. 1A and 1B)
2. Overall Configuration of Head 2 (FIGS. 2A to 2C)
3. Configuration of Ejecting Element 15 (FIG. 3)
   3.1. Overview of Ejecting Element 15
   3.2. Flow Channel Member 19
   3.3. Actuator 17
4. Operation of Ejecting Element 15 (FIG. 4)
5. Principles Used to Reduce Variations in Ejection Velocity (FIGS. 5A to 6)
   5.1. Factors Causing Variations
   5.2. Overview of Method for Reducing Variations
   5.3. Consideration of Effects of Attenuation Rate
6. Derivation of Formulas (Formulas (1) to (3)) (FIGS. 7A to 13C)
   6.1. Derivation Method
   6.2. Calculation Results
   6.3. Amplitude
7. Method for Adjusting Parameters
8. Method of Determining Parameters
9. Summary of Embodiments (1. Overall Configuration of Printer)

Figure 1B:
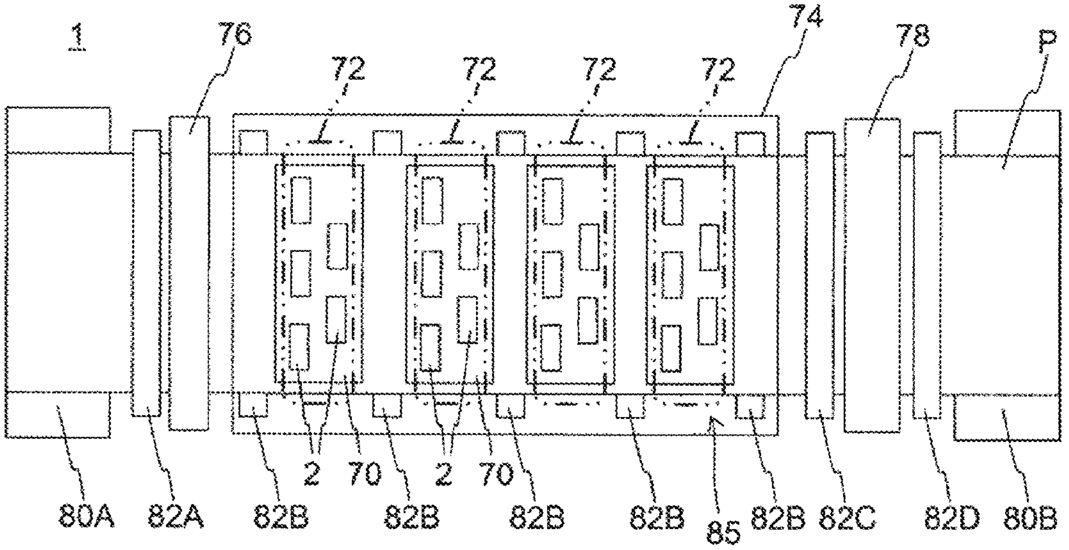
FIG. 1B is a plan view schematically illustrating the recording device according to an embodiment.

FIG. 1A is a schematic side view of the printer 1 according to an embodiment. FIG. 1B is a schematic plan view of the printer 1.

The printer 1 is configured as a color inkjet printer. The printer 1 moves printing paper P (example of recording medium) relative to the heads 2 by conveying the printing paper P from a feeding roller 80A to a collecting roller 80B. The feeding roller 80A and the collecting roller 80B, as well as various other rollers described later, make up a moving unit 85 that moves the printing paper P and the heads 2 relative to each other. Based on print data, which is data such as images and characters, etc., a control device 88 performs recording such as printing on the printing paper P by controlling the heads 2 in order to eject liquid toward the printing paper P and deposit droplets on the printing paper P.

In this embodiment, the heads 2 are fixed to the body of the printer 1, and the printer 1 is a so-called line printer. Another embodiment of a recording device may be a so-called serial printer. In a serial printer, for example, the heads 2 would be made to reciprocate in a direction that intersects a conveyance direction of the printing paper P, for example, in a substantially perpendicular direction. During this reciprocating motion, an operation of ejecting droplets and conveying of the printing paper P are performed in an alternating manner.

In the printer 1, four flat head-mounting frames 70 (hereinafter may be simply referred to as "frames") are fixed in place so as to be substantially parallel to the printing paper P. Each frame 70 is provided with five holes, which are not illustrated, and five heads 2 are mounted in the holes. The five heads 2 mounted in one frame 70 make up one head group 72. The printer 1 includes four head groups 72, making a total of twenty heads 2.

The heads 2 mounted in the frames 70 are configured such that the parts of the heads 2 that eject liquid face the printing paper P. The distance between each head 2 and the printing paper P is around 0.5 to 20 mm, for example.

The twenty heads 2 may be directly connected to the control device 88, or may be connected to the control device 88 via a distribution unit that distributes print data. For example, the control device 88 may send the print data to one distribution unit and the one distribution unit may distribute the print data to the twenty heads 2. For example, the control device 88 may distribute print data to four distribution units corresponding to the four head groups 72, and each distribution unit may then distribute the print data to the five heads 2 in the corresponding head group 72.

Each head 2 has an elongated long and narrow shape in a direction from front to back in FIGS. 1A and 1*n* the vertical direction in FIG. 1B. Within a single head group 72, three heads 2 are arrayed along a direction that intersects, for example, is substantially perpendicular to, the conveyance direction of the printing paper P, and the other two heads 2 are arrayed at positions that are displaced along the conveyance direction so as to be positioned between the three heads 2. In other words, in one head group 72, the heads 2 are disposed in a staggered manner. The heads 2 are disposed so that the regions that can be printing on by the heads 2 are connected or overlap at their edges in the width direction of the printing paper P, i.e., a direction that intersects the conveyance direction of the printing paper P. This enables printing to be performed without the occurrence of gaps in the width direction of the printing paper P.

The four head groups 72 are disposed along the conveyance direction of the printing paper P. Each head 2 is supplied with liquid, for example, ink, from a liquid supply tank, which is not illustrated. The heads 2 belonging to one head group 72 are supplied with ink of the same color, and four colors of ink can be printed with the four head groups 72. The colors of ink ejected from the head groups 72 are, for example, magenta (M), yellow (Y), cyan (C), and black (K). Color images can be printed by printing these inks via control performed by the control device 88.

The number of heads 2 mounted in the printer 1 may be one head 2 if the printer 1 is monochromatic and prints a printable area with one head 2. The number of heads 2 included each head group 72 and/or the number of head groups 72 may be changed as appropriate depending on the object to be printed and/or printing conditions. For example, the number of head groups 72 may be increased in order to print a greater number of colors. If multiple head groups 72, which print in the same color, are disposed and made to print in an alternating manner in the conveyance direction, the conveyance speed can be increased even if heads 2 having the same performance are used. This allows a larger area to be printed per unit time. Multiple head groups 72, which print in the same color, may be prepared and disposed so as to be shifted from each other in a direction that intersects the conveyance direction in order to increase the resolution in the width direction of the printing paper P.

Furthermore, in addition to printing colored inks, a liquid, such as a coating agent, may be printed uniformly or in a pattern by the heads 2 in order to perform a surface treatment on the printing paper P. For example, a coating agent can be used to form a liquid receptive layer in order to make a liquid easier to fix in place when a recording medium that does not readily soak up liquid is used. Other coating agents can be used to form a liquid penetration inhibiting layer so that the liquid does not bleed too much or mix too much with another liquid that has been deposited next to the liquid when using a recording medium that readily soaks up liquid. In addition to being printed using the heads 2, a coating agent may be applied uniformly by an applicator 76, which is controlled by the control device 88.

The printer 1 performs printing on the printing paper P, which is a recording medium. The printing paper P is wound around the feeding roller 80A. The printing paper P fed from the feeding roller 80A passes under the heads 2 mounted in the frames 70, then between two conveying rollers 82C, and is finally collected by the collecting roller 80B. When printing is being performed, the printing paper P is conveyed at a constant speed by rotating the conveying rollers 82C and printed on by the heads 2.

Next, details of the printer 1 will be described in the order in which the printing paper P is conveyed. The printing paper P fed from the feeding roller 80A passes between the two guide rollers 82A and then under the applicator 76. The applicator 76 applies a coating agent as described above to the printing paper P.

The printing paper P next enters a head chamber 74, which houses the frames 70 in which the heads 2 are mounted. Although some parts of the head chamber 74 are connected to the outside, such as the places where the printing paper P enters and exits, the head chamber 74 is generally a space that is isolated from the outside. The head chamber 74 is controlled by the control device 88 or another device with respect to control factors such as temperature, humidity, and air pressure, as needed. In the head chamber 74, the range of variation of the control factors described above can be made smaller than the outside, because the effects of disturbances can be reduced compared to outside where the printer 1 is installed.

Five guide rollers 82B are disposed in the head chamber 74, and the printing paper P is conveyed over the guide rollers 82B. The five guide rollers 82B are disposed so as to protrude outward at the center towards the direction in which the frames 70 are located when viewed from the side. As a result, the printing paper P being conveyed over the five guide rollers 82B has an arc-like shape when viewed from the side, and the printing paper P is stretched flat between the individual guide rollers 82B as a result of tension being applied to the printing paper P. One frame 70 is disposed between two guide rollers 82B. Each frame 70 is installed at a slightly different angle so as to be parallel to the printing paper P conveyed therebelow.

After exiting the head chamber 74, the printing paper P passes between two conveying rollers 82C, through the inside of a dryer 78, between two guide rollers 82D, and is then collected by the collecting roller 80B. The conveyance speed of the printing paper Pis, for example, 100 m/min. Each roller may be controlled by the control device 88 or manually operated by a person.

Drying is performed in the dryer 78, and as a result, overlapping wound parts of the printing paper P are less likely to stick to each other or parts of undried liquid are less likely to rub against each other on the collecting roller 80B. In order to perform printing at high speed, drying also needs to be fast. In order to speed up the drying process, the dryer 78 may perform drying by using multiple drying methods in sequence or by using multiple drying methods together. Drying methods used in such cases may include, for example, blowing warm air, irradiation with infrared rays, and contact with heated rollers. When irradiating with infrared rays, infrared rays in a specific frequency range may be applied to the printing paper P so as to speed up the drying process while minimizing damage to the printing paper P. When the printing paper P is brought into contact with a heated roller, the printing paper P may be conveyed along the cylindrical surface of the roller so as to extend the time during which heat transfer occurs. The conveyance range along the cylindrical surface of the roller is preferably equivalent to at least ¼ of circumference the cylindrical surface of the roller, and more preferably equivalent to ½ or more of the circumference of the cylindrical surface of the roller. When printing UV-curable inks or the like, a UV radiation light source may be disposed instead of or in addition to the dryer 78. The UV radiation light source may be disposed between the frames 70.

The printer 1 may include a cleaning section that cleans the heads 2. The cleaning section performs cleaning by performing wiping and/or capping, for example. Wiping is performed, for example, by using a flexible wiper to scrape the surface of the area from which the liquid is ejected, for example, an ejection surface 3*a* (described later), so as to remove any liquid adhering to that surface. Capping cleaning is performed in the following manner, for example. First, a cap is placed over the area from which the liquid is ejected, for example, the ejection surface 3*a* (this is called capping), so that a substantially sealed space is created between the ejection surface 3*a* and the cap. In such a state, ejecting of liquid is repeatedly performed in order to remove any liquid that has become clogged in nozzles 5, which has a higher viscosity than the standard state, and/or foreign matter etc. Capping makes liquid less likely to splash into the printer 1 during cleaning and to adhere to the printing paper Por conveying mechanisms such as rollers. Once the ejection surface 3*a* has been cleaned, the ejection surface 3*a* may be additionally wiped. Cleaning by wiping and/or capping may be performed manually by a person operating the wipers and/or caps attached to the printer 1, or may be performed automatically by the control device 88.

In addition to the printing paper P, the recording medium may be a roll of cloth or another medium. Instead of conveying the printing paper P directly, the printer 1 may convey a conveyor belt and the recording medium may be conveyed by placing the recording medium on the conveyor belt. Thus, sheet paper, cut cloth, wood, or tiles may be used as the recording medium. In addition, a liquid containing electrically conductive particles may be ejected from the heads 2 in order to print wiring lines and so on of electronic devices. Furthermore, a chemical agent may be produced by ejecting a prescribed amount of a liquid chemical agent or a liquid containing a chemical agent from the heads 2 toward a reaction vessel or the like and causing a reaction, for example.

The printer 1 may be equipped with a position sensor, a velocity sensor, a temperature sensor, and so on, and the control device 88 may control each part of the printer 1 in accordance with the status of each part of the printer 1 as determined from information from the sensors. For example, if the temperature of any of the heads 2, the temperature of the liquid in the liquid supply tank that supplies liquid to the heads 2, and/or the pressure applied to the heads 2 by the liquid in the liquid supply tank affects the ejection characteristics of the ejected liquid, i.e., the ejection volume and/or ejection velocity, and so on, the drive signal for causing the liquid to be ejected may be changed in response to such information on the ejection characteristics.

Hereafter, for convenience, the description basically focuses on one head 2. Therefore, for example, hereafter, when "all the nozzles 5" are referred to, this means all the nozzles 5 in one head 2 unless otherwise noted. When "all the nozzles 5" are referred to, unique nozzles may be treated as being different from those specified by the term "all the nozzles 5", unless otherwise noted. For example, dummy nozzles that do not eject droplets may be provided further towards the outside than the nozzles 5 located at edges of the head 2 in order to make the ejection characteristics of the nozzles 5 located at the edges of the head 2 closer to those of the nozzles 5 located at the center of the head 2. Such dummy nozzles do not need to be included in the case where the term "all the nozzles 5" is used. This is also the case for components other than the nozzles 5 (for example, individual flow channels 25 and actuators 17).

(2. Overall Configuration of Head)

Figure 2A:
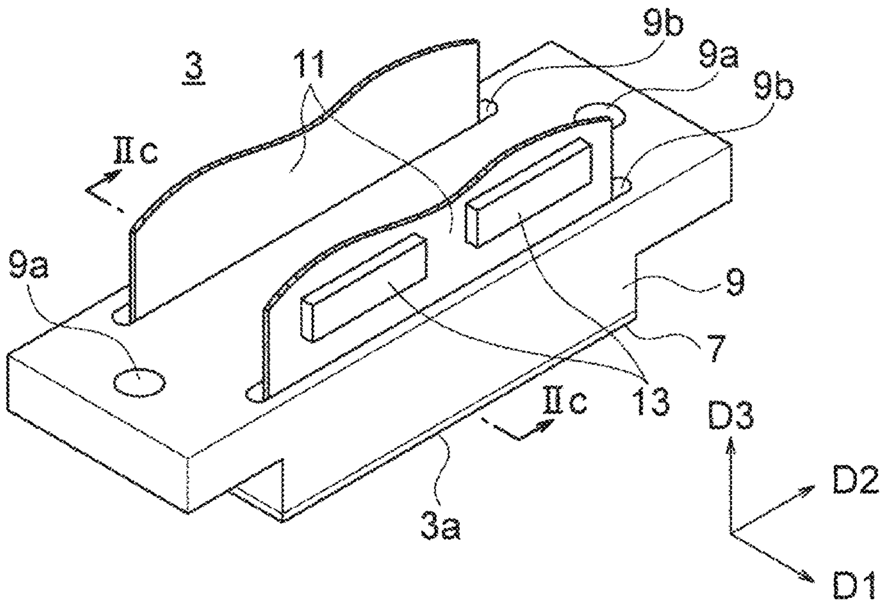
FIG. 2A is a perspective view of a liquid ejection head according to an embodiment.
Figure 2B:
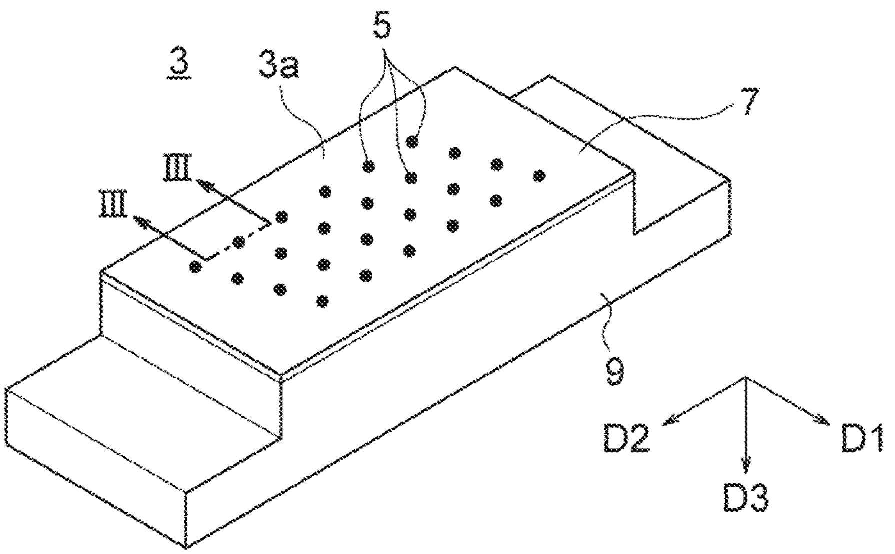
FIG. 2B is a perspective view from the opposite side from FIG. 2A.
Figure 2C:
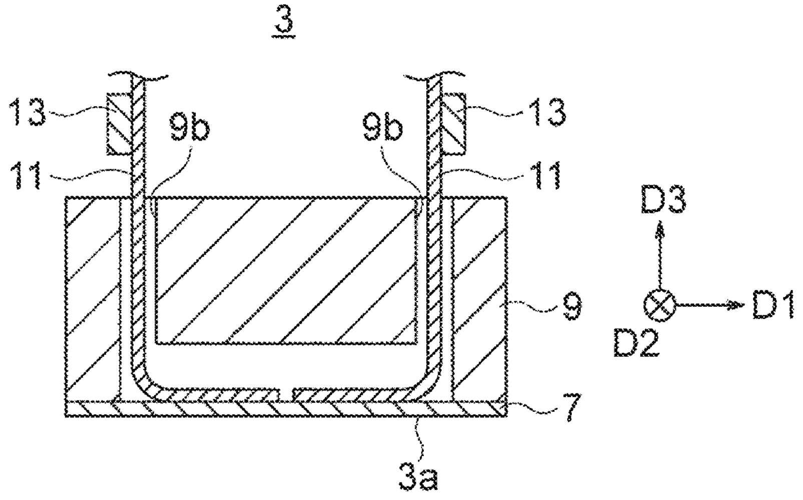
FIG. 2C is a sectional view taken along line IIc-IIc in FIG. 2A.

FIG. 2A is a perspective view of a head body 3 of the head 2 as viewed from the opposite side from the side where the recording medium (printing paper P) would be located. FIG. 2B is a perspective view of the head body 3 as viewed from the side where the recording medium would be located. FIG. 2C is a sectional view taken along line IIc-IIc in FIG. 2A.

A Cartesian coordinate system consisting of D1, D2, and D3 axes and so on is depicted in these figures for convenience. The D1 axis is defined as being parallel to the direction of relative movement between the head body 3 and the recording medium (conveyance direction of printing paper P in FIG. 1A). The relationship between the positive and negative sides of the D1 axis and the direction of travel of the recording medium relative to the head body 3 does not particularly matter in the description of this embodiment. The D2 axis is defined as being parallel to the recording medium and perpendicular to the D1 axis. The positive and negative sides of the D2 axis also do not particularly matter here. The D3 axis is defined as being perpendicular to the recording medium. The −D3 side is assumed to be the side located in a direction from the head body 3 towards the recording medium. The head body 3 may be used with either direction being regarded as up or down, but for convenience, the +D3 side may be regarded as corresponding to up, and terms such as a "bottom surface" may be used.

One head 2 includes one head body 3. The head body 3 is the part that is directly responsible for ejecting liquid and has the ejection surface 3*a* that faces the recording medium. Multiple nozzles 5 for ejecting liquid are formed in the ejection surface 3*a*. In addition to the head body 3, the head 2 may further include, for example, a circuit board connected to the head body 3 and/or a housing covering the top of the head body 3. Regardless of whether or not the head 2 includes any components other than the head body 3, the head body 3 may be regarded as being an example of a liquid ejection head of the present disclosure.

The multiple nozzles 5 are disposed at different positions in the D2 direction. Therefore, a two-dimensional image is formed by ejecting ink drops from the multiple nozzles 5 while the moving unit 85 moves the head 2 and the recording medium relative to each other in the D1 direction. The multiple nozzles 5 may be disposed in a two-dimensional arrangement, as in the illustrated example, or may be disposed in a one-dimension arrangement, unlike in the illustrated example.

The specific size, number, pitch, and arrangement pattern of the multiple nozzles 5 may be set as appropriate. FIG. 2B is a schematic diagram, and therefore the nozzles 5 are illustrated as being large relative to the size of the head body 3, and the number of nozzles 5 in one head body 3 is illustrated as being small. Generally, the nozzles 5 would be smaller in size and greater in number than in the illustrated example. For example, in one head body 3, the number of nozzles 5 may be greater than or equal to 100 and less than or equal to 10000. For example, one head body 3 may include multiple nozzles 5 having a pitch and arrangement pattern such that the dot density in the D2 direction is 800 dpi or higher and 1600 dpi or lower.

The head body 3 includes, for example, the following components. A facing substrate 7, which has the ejection surface 3*a*. A rear member 9, which is fixed above the facing substrate 7. One or more (two in the illustrated example) flexible substrates 11, which are electrically connected to the facing substrate 7. One or more (two in the illustrated example) drivers 13 mounted on each flexible substrate 11.

The facing substrate 7 directly contributes to ejecting of droplets. The facing substrate 7 includes the previously-described flow channel member 19 and the actuators 17 (FIG. 3). The shape, size, and so forth of the facing substrate 7 may be set as appropriate. In the illustrated example, the facing substrate 7 has a substantially rectangular flat plate-like shape. The thickness (in the D3 direction) is, for example, 0.5 mm or more and 2 mm or less. The facing substrate 7 may be regarded as being an example of a liquid ejection head of the present disclosure.

The rear member 9, for example, serves as an intermediary between the facing substrate 7 and other components. For example, the rear member 9 helps position the facing substrate 7 relative to the frame 70 described above. Specifically, for example, the bottom surface of the rear member 9 is bonded to an outer edge portion of the top surface of the facing substrate 7, and an upper flange-like portion of the rear member 9 is supported by the frame 70 while a lower portion of the rear member 9 is inserted into a hole in the frame 70. For example, the rear member 9 serves as an intermediary between an ink tank, which is not illustrated, and the facing substrate 7 with respect to ink flow. Specifically, the rear member 9 has openings 9*a* in the top surface thereof and openings, which are not illustrated, in the bottom surface thereof, which is bonded to the facing substrate 7. The openings in the top surface are connected to the openings in the bottom surface by flow channels, which are not illustrated, inside the rear member 9. The openings 9*a* are connected to the ink tank via tubes and so on, which are not illustrated.

The flexible substrates 11 contribute to the electrical connections between the facing substrate 7 and the control device 88. Specifically, for example, the flexible substrates 11 are inserted into slits 9*b*, which penetrate vertically through the rear member 9. The portions of the flexible substrates 11 that extend downward from the slits 9*b* are disposed so as to face the top surface of the facing substrate 7 and are bonded to the top surface of the facing substrate 7 by conductive bumps (for example, solder), which are not illustrated. The portions of the flexible substrates 11 that extend upward from the slits 9*b* are connected to a cable, which is not illustrated, extending from the control device 88 via connectors mounted on those portions or on a rigid substrate that is connected to the flexible substrates 11.

The drivers 13, for example, contribute to driving and control of the actuators 17 of the facing substrate 7. Specifically, for example, the drivers 13 are input with control signals from the control device 88 via the flexible substrates 11, generate driving power (or, from another perspective, drive signals) based on the input control signals, and input the generated driving power to the actuators 17 via the flexible substrates 11. The division of roles between the drivers 13 and the control device 88 may be set as appropriate. For example, information that defines the shape of a pulse Ps (or a pulse width PW from another perspective) may be held by the control device 88 or by the drivers 13. The drivers 13 may be configured as ICs (integrated circuits), for example. The shape, size, number, positions, and so on of the drivers 13 may be set as appropriate.

(3. Configuration of Ejecting Element)

(3.1. Overview of Ejecting Element)

FIG. 3 is a sectional view taken along line III-III in FIG. 2B. In other words, FIG. 3 is a schematic sectional view illustrating a portion of the facing substrate 7 in an enlarged manner.

The facing substrate 7 includes multiple ejecting elements 15. The multiple ejecting elements 15 are disposed two-dimensionally (or one-dimensionally) along the ejection surface 3*a*, in the same or a similar manner to the multiple nozzles 5. As mentioned above, each ejecting element 15 includes an individual flow channel 25 and an actuator 17. From another perspective, the facing substrate 7 includes the substantially plate-shaped flow channel member 19 and the actuator substrate 21 that overlaps the flow channel member 19. The flow channel member 19 includes multiple individual flow channels 25. The actuator substrate 21 includes multiple actuators 17. In other words, multiple ejecting elements 15 are constituted by the flow channel member 19 and the actuator substrate 21.

The configurations of the multiple ejecting elements 15 may be identical, for example. Therefore, unless otherwise specified or unless there are contradictions, the description of one ejecting element 15 in an embodiment may be applied to any of the multiple ejecting elements 15 (excluding unique ones as mentioned above) of the head 2. The identical configurations referred to in this paragraph do not include the positions and orientations of the ejecting elements 15 (or components thereof) within the head 2 in plan view (viewed in the D3 direction). In addition, the configurations of some of and two or more of the ejecting elements 15 in the head 2 may differ in terms of the details thereof (for example, the specific shape and dimensions of the partial flow channel 45) from the configuration of other some of and two or more of the ejecting elements 15.

(3.2. Flow Channel Member)

The flow channel member 19 has, for example, a configuration in which multiple plates 27A to 27J (A to J may be omitted hereafter) are stacked on top of one another. Multiple holes (mainly through holes, but may also be recesses) that make up the flow channels are formed in the plates 27. The thicknesses and the number of the multiple plates 27 may be set as appropriate in accordance with the shapes of the flow channels etc. The multiple plates 27 may be formed of any suitable material. For example, the multiple plates 27 are formed of a metal or a resin. The thickness of the plates 27 is, for example, greater than or equal to 10 μm and less than or equal to 300 μm. The plates 27 are fixed to each other by an adhesive, which is not illustrated, provided between the plates 27, for example.

The flow channel member 19 includes, for example, a common flow channel 23 and multiple individual flow channels 25 (one is illustrated in FIG. 3), each connected to the common flow channel 23. Ink supplied from the rear member 9 to the flow channel member 19 is supplied from the common flow channel 23 to the multiple individual flow channels 25. Each individual flow channel 25 includes, for example, a connection portion 37, a constriction 39, a supply channel 41, the pressurization chamber 43, the partial flow channel 45, and the nozzle 5, in order from the side where the common flow channel 23 is located.

The specific shape and dimensions of each flow channel in the flow channel member 19 may be set as appropriate. In the illustrated example, the following is true.

The common flow channel 23 may extend in any direction along the ejection surface 3*a*. There may only be one common flow channel 23, or, for example, multiple common flow channels 23 may be provided in parallel with each other. The cross-sectional shape of the common flow channel 23 is rectangular.

The multiple individual flow channels 25 (or, from another perspective, ejecting elements 15) are arranged in the length direction of each common flow channel 23. The multiple nozzles 5 may be arranged in a single row on one side or in a total of two or four rows on both sides, for example, with respect to the common flow channel 23 to which the nozzles 5 are connected.

The pressurization chamber 43, for example, has an opening in the top surface (the surface on the opposite side from the ejection surface 3*a*) of the flow channel member 19, which is sealed by the actuator 17. In addition, the pressurization chamber 43 may be sealed by the plate 27. However, this can also be considered a question of whether the plate 27 that seals the pressurization chamber 43 is regarded as part of the flow channel member 19 or as part of the actuator 17. In any case, the pressurization chamber 43 is positioned in an upper part of the flow channel member 19.

The shapes of the multiple pressurization chambers 43 are, for example, identical to each other. The shape of each pressurization chamber 43 may be set as appropriate. For example, the pressurization chamber 43 is formed in a thin shape that extends along the top surface of the flow channel member 19 with a constant thickness. However, the pressurization chamber 43 may include parts having different thicknesses. A thin shape is a shape in which the thickness is smaller than any of the diameters in a plan view, for example.

For example, the planar shape of the pressurization chamber 43 may be a shape having a longitudinal direction and a transverse direction that are perpendicular to each other (such as a diamond or an oval), or a shape that does not have such directions (such as a circle). In addition, the relationship between the longitudinal and transverse directions and the arrangement of the multiple pressurization chambers 43 may also be freely set.

The partial flow channel 45 extends from the underside of the pressurization chamber 43 towards the ejection surface 3*a*. The shape of the partial flow channel 45 is substantially cylindrical. The partial flow channel 45 may extend at an incline to the vertical direction from the pressurization chamber 43 to the ejection surface 3*a* (as in the illustrated example), may extend without being inclined, may extend in a straight line, or may be curved in part or the entirety thereof. The area of a cross-section of the partial flow channel 45 may be constant along the length direction of the partial flow channel 45, or may vary depending on the position in the length direction. In plan view (looking in the D3 direction), the partial flow channel 45 is connected to an end portion of the pressurization chamber 43 in a prescribed direction (for example, the longitudinal direction of the pressurization chamber 43 in plan view), for example.

The nozzle 5 has an opening in part of the bottom surface (surface on opposite side from the pressurization chamber 43) of the partial flow channel 45. The nozzle 5 is, for example, positioned roughly in the center of the bottom surface of the partial flow channel 45. However, the nozzle 5 may be provided so as to be offset from the center of the bottom surface of the partial flow channel 45. The shape of a longitudinal cross-section of the nozzle 5 is tapered, with the diameter decreasing with increasing proximity to the ejection surface 3*a*. However, part or the entirety of the nozzle 5 may be reverse tapered.

The connection portion 37 extends upward from the top surface of the common flow channel 23, for example. The constriction 39 extends in the direction along the plate 27 from that region. The supply channel 41 extends upward from the constriction 39 and is connected to the bottom surface of the pressurization chamber 43. In plan view (looking in the D3 direction), the position at which the supply channel 41 is connected to the pressurization chamber 43 is, for example, at an end portion of the bottom surface of the pressurization chamber 43, on the opposite side from the partial flow channel 45, with respect to the center of the bottom surface of the pressurization chamber 43.

The cross-sectional area (the area of a cross-section that intersects the flow direction) of the constriction 39 is smaller than that of the connection portion 37 and the supply channel 41. For example, except for the nozzle 5, this part has the smallest cross-sectional area in the individual flow channel 25. Regarding the main vibration described above (the natural vibration of the liquid in the individual flow channel 25), pressure waves of the liquid tend to be reflected at the constriction 39. Therefore, unlike in the description of the embodiment, a flow channel extending from the connection portion 37 to the nozzle 5, or a flow channel extending from the constriction 39 to the nozzle 5 may be regarded as the individual flow channel.

As mentioned above, the configuration of some of and two or more of the ejecting elements 15 may differ in terms of the details thereof from the configuration of other some of and two or more of the ejecting elements 15. For example, in such a case, the pressurization chambers 43 may be arrayed in two rows on one side of the common flow channel 23, and the length of the constriction 39 and/or the orientation of the constriction 39 with respect to the other flow channels (those in the individual flow channels 25 and/or the common flow channel 23) may differ from row to row (but are the same within each row) due to the distances between the common flow channel 23 and the pressurization chambers 43 differing from row to row. For example, in order to shift the positions of multiple nozzles 5 connected to multiple pressurization chambers 43 arrayed in a single row parallel to the D1 direction (paper feed direction) to each other in the D2 direction, the shapes and dimensions of the partial flow channels 45 within the row may be different from each other (the configurations of the rows are the same as each other).

(3.3. Actuator)

The actuator substrate 21 has a substantially plate-like shape that is sufficiently wide to span across the multiple pressurization chambers 43. The actuators 17 are piezoelectric type actuators that apply pressure to the ink via mechanical strain of a piezoelectric material. The piezoelectric actuators, for example, are so-called unimorph piezoelectric actuators. The actuators 17 may be configured with other types of piezoelectric actuators, such as bimorph actuators. The unimorph actuators 17 (actuator substrate 21), for example, include a vibration plate 29, a common electrode 31, a piezoelectric layer 33, and individual electrodes 35, in this order from the side where the flow channel member 19 is located.

The vibration plate 29, the common electrode 31, and the piezoelectric layer 33, for example, extend across the multiple pressurization chambers 43 in plan view. In other words, these layers are shared by multiple pressurization chambers 43. One individual electrode 35 is provided for each pressurization chamber 43. Each individual electrode 35 includes a body 35*a* that overlaps the corresponding pressurization chamber 43 and a lead-out electrode 35*b* that extends from the body 35*a*. The body 35*a*, for example, has a shape and size substantially the same as the shape and size of the pressurization chamber 43.

The specific material and thickness of each layer may be set as appropriate. For example, the material of the piezoelectric layer 33 may be a ceramic such as PZT (lead zirconate titanate). The material of the vibration plate 29 may be a ceramic that exhibits or does not exhibit piezoelectricity. The common electrode 31 and the individual electrodes 35 may be composed of a metal such as a Ag-based or Au-based metal. The thickness of the vibration plate 29 and the thickness of the piezoelectric layer 33 may each be greater than or equal to 10 μm and less than or equal to 40 μm. The thickness of the common electrode 31 may be greater than or equal to 1 μm and less than or equal to 3 μm. The thickness of each individual electrode 35 may be greater than or equal to 0.5 μm and less than or equal to 2 μm.

Out of the piezoelectric layer 33, at least the portion sandwiched between the body 35*a* of each individual electrode 35 and the common electrode 31 is polarized in the thickness direction. Thus, for example, when an electric field (voltage) is applied in the direction of polarization of the piezoelectric layer 33 by the body 35*a* and the common electrode 31, the piezoelectric layer 33 contracts in a direction along the layer. This contraction is restricted by the vibration plate 29. As a result, the actuator 17 bends and deforms in a convex manner towards the pressurization chamber 43. When an electric field (voltage) is applied in the opposite direction from that mentioned above by the body 35*a* and the common electrode 31, the actuator 17 bends and deforms towards the side opposite from the side where the pressurization chamber 43 is located. By using such bending deformation, as described above, the volume of the pressurization chamber 43 can be changed, pressure can be applied to the ink inside the pressurization chamber 43, and ink can be ejected from the nozzle 5.

The common electrode 31 is, for example, supplied with a potential that is constant with the passage of time during printing. The constant potential is, for example, a reference potential. On the other hand, the individual electrodes 35, for example, are input with signals whose potentials change with the passage of time. This changes the intensity of the electric field applied to the piezoelectric layer 33. As a result, this can cause the actuators 17 to bend and deform, as described above. The bending deformation of multiple actuators 17 can be individually controlled by individually inputting multiple signals to multiple individual electrodes 35. In turn, the amount of droplets ejected from multiple nozzles 5 can be individually controlled in accordance with the content of the image intended to be printed.

The actuators 17 may be connected to an external controller (for example, the drivers 13) as appropriate. For example, the flexible substrates 11 are disposed so as to face the top surface of actuator substrate 21. Pads, which are not illustrated, of the flexible substrates 11 are bonded to the edges of the lead-out electrodes 35*b* via conductive bumps. As a result, the individual electrodes 35 and the drivers 13 are connected to each other via signal lines, which are not illustrated, of the flexible substrates 11. Thus, signals can be input to the individual electrodes 35 from the drivers 13.

Although not specifically illustrated, the actuator substrate 21 includes via conductors at appropriate positions in plan view that penetrate through the piezoelectric layer 33, are connected to the common electrode 31, and are exposed at the top surface of the piezoelectric layer 33. Pads, which are not illustrated, on the flexible substrates 11 are connected to the via conductors via conductive bumps. In this way, for example, the common electrode 31 is connected to reference potential wiring lines, which are not illustrated, of the flexible substrates 11. Thus, a reference potential can be supplied to the common electrode 31.

(4. Operation of Ejecting Element)

As mentioned above, the ejecting elements 15 eject ink droplets by applying pressure to the pressurization chambers 43 using the actuators 17. The driving method may be, for example, a pull-push method. The operation of ejecting ink droplets using the pull-push method is as follows.

Figure 4:
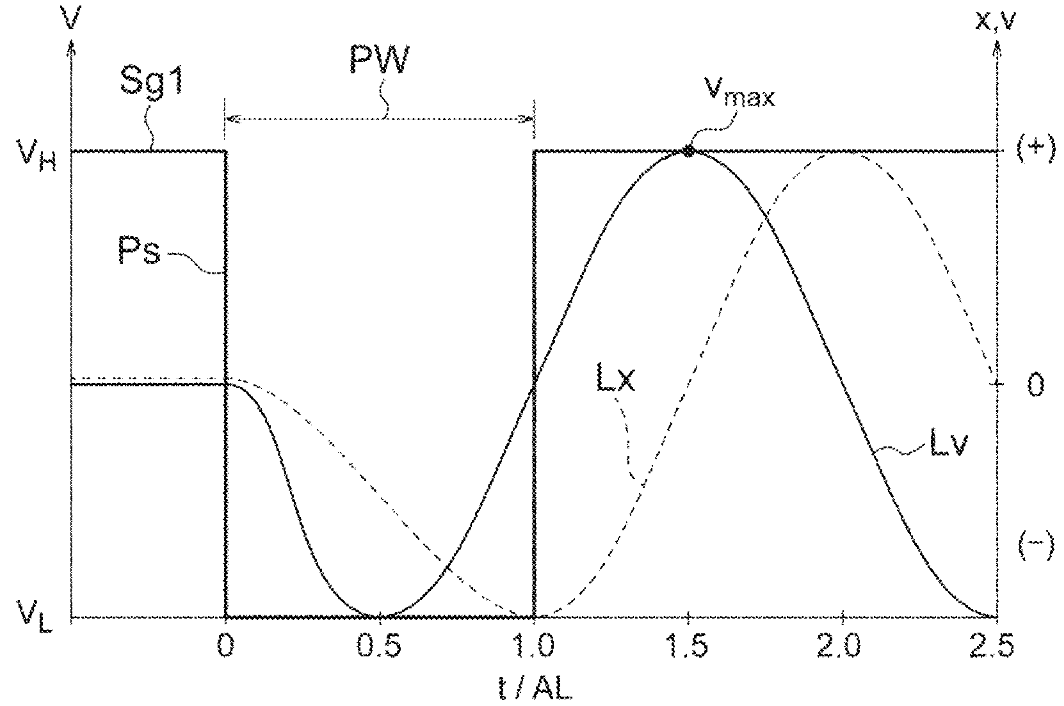
FIG. 4 is a conceptual diagram for explaining an ejection operation.

FIG. 4 is a schematic diagram for describing the ejection operation of the ejecting elements 15.

In this figure, the horizontal axis represents normalized time t/AL, which is obtained by dividing time t by AL (acoustic length). AL will be described later. The vertical axis on the left represents a potential V of a drive signal Sg1 that the driver 13 inputs to the actuator 17 (or, more specifically, to the individual electrode 35). The vertical axis on the right represents a displacement x and a velocity v of a meniscus (the liquid surface of ink in the nozzle 5). On the vertical axis on the right, the +side (upper side in the figure) represent the displacement x and velocity v on the external side (−D3 side) of the nozzle 5. Lines Lx and Lv illustrate the changes over time of the displacement x and velocity v, respectively.

In the description given here, we assume that when the potential of the individual electrode 35 is higher than the potential of the common electrode 31, an electric field is applied to the piezoelectric layer 33 in the same direction as the polarization direction, and the actuator 17 is bent towards the pressurization chamber 43. However, the potential levels of the individual electrode 35 and common electrode 31 when the actuator 17 is deflected toward the pressurization chamber 43 may be opposite to those given in the description here.

Before there is an ejection request, the drive signal Sg1 (or, from another perspective, the individual electrode 35) is set to a higher potential than the common electrode 31 (hereinafter referred to as a "high potential $V_H$"). Then, for each ejection request, the potential of the individual electrode 35 is set to a potential lower than the high potential $V_H$ (hereinafter referred to as "low potential $V_L$"), and is then set to the high potential $V_H$ again at a predetermined timing. The low potential $V_L$ may be set as appropriate, but for example, is the same potential as the common electrode 31. From another perspective, the pulse Ps with the pulse width PW is input to the individual electrode 35 each time there is an ejection request.

Before an ejection request, the actuator 17 is in a bent shape toward the pressurization chamber 43 due to the drive signal Sg1 being at the high potential $V_H$. The displacement of the meniscus x at this time is set to zero. In addition, the velocity of the meniscus, v, is basically or ideally zero.

Next, when the drive signal Sg1 comes to be at the low potential $V_L$ (t/AL=ω), the actuator 17 returns to its original shape (flat shape) (beginning), and the volume of the pressurization chamber 43 increases. As a result, a negative pressure is applied to the liquid inside the pressurization chamber 43. As a result, the meniscus is displaced toward the inside of the nozzle 5, and the absolute value of the velocity associated with that displacement increases. From another perspective, the liquid inside the individual flow channel 25 begins to vibrate at the natural vibration period thereof.

After that, the absolute value of the velocity of the meniscus reaches a plateau (t/AL=approximately 0.5) and begins to decrease. Furthermore, when t/AL is approximately 1, the volume of the pressurization chamber 43 is maximum, and the pressure is approximately zero. At this time, the displacement x of the meniscus is maximally toward the inside of nozzle 5, and the velocity v is approximately zero. Then, the volume of the pressurization chamber 43 begins to decrease and the pressure increases.

As a result of the drive signal Sg1 being set to the low potential $V_L$ and then to the high potential $V_H$, the actuator 17 begins to bend towards the pressurization chamber 43 again. The first vibration applied by the falling edge of the pulse Ps and the second vibration applied by the rising edge of the pulse Ps overlap, and a greater pressure is applied to the liquid. This pressure propagates inside the partial flow channel 45 and causes the liquid to be ejected from the nozzle 5.

In other words, a droplet can be ejected by supplying the pulse Ps, which has the low potential $V_L$ for a certain period of time relative to the high potential $V_H$, to the individual electrode 35. In principle, the maximum value of the velocity v (referred to as maximum velocity $v_{max}$) is greatest when the pulse width PW of the pulse Ps is set to half the time (AL) of the natural vibration period of the liquid in the individual flow channel 25. This in turn maximizes the ejection velocity and ejection volume of liquid.

As mentioned in the above paragraph, AL is conceptually half the natural vibration period of the liquid in the individual flow channel 25. However, the natural vibration period is not easily theoretically calculated. Therefore, although paradoxical, for example, when an ejection operation is carried out with various pulse widths PW, the length of the pulse width PW for which the maximum velocity $v_{max}$ (or ejection velocity or ejection volume) is greatest may be defined as AL, and twice that length may be defined as the natural vibration period of the liquid in the individual flow channel 25. From another perspective, when determining the angular frequency ω1 of the individual flow channel 25, the range of the individual flow channel 25 (for example, whether or not the constriction 39 is included) does not need to be clearly defined. The same or similar can be said for the angular frequency θ2 of the partial flow channel 45.

In reality, since there are other factors to consider, such as ensuring the ejected droplets combine into a single droplet, the pulse width PW may be set to a value around 0.5 AL to 1.5 AL. Since the ejection volume can be reduced by setting the pulse width PW to a value shifted from AL, the pulse width PW may be set to a value shifted from AL in order to reduce the ejection volume.

The falling and/or rising edges of the pulse Ps may be inclined with respect to the vertical axis, or may change in a step-like manner. The drive signal Sg1 may include waveforms other than the pulse Ps. For example, the drive signal Sg1 may include a waveform for reducing residual fluctuations in the meniscus. Other such waveforms may be connected to the pulse Ps or separated from the pulse Ps.

The intended shading in the images (including text) to be formed on the recording medium may be realized using an appropriate method. For example, the shading may be achieved by varying the size of the dots on the recording medium, by varying the number of dots per unit area (sparse or dense), or by using a combination of these methods. The size of the dots may be adjusted varying the size of a single droplet, the number of droplets that land in a single location, or a combination of these methods.

From another perspective, the intended shading may be achieved by changing the size of the droplets ejected from the nozzles 5, which is adjusted by changing the potential difference between the high potential $V_H$ and the low potential $V_L$ of the drive signal Sg1, by increasing or decreasing the number of droplets, which is adjusted by changing the number of pulses Ps contained in the drive signal Sg1 corresponding to a single ejection request, by increasing or decreasing the number of ejecting elements 15 performing an ejection operation per unit area, or by using a combination of these methods.

(5. Principles Used to Reduce Variations in Ejection Velocity)

First, examples of factors that cause variations in ejection velocity will be described, and then a method for reducing variations in ejection velocity caused by one of these factors will be described.

(5.1. Factors Causing Variations)

As described with reference to FIG. 4, in the case of the pull-push method, the maximum velocity $v_{max}$ is greatest when the pulse width PW is AL. In other words, the maximum velocity $v_{max}$ changes in accordance with the pulse width PW, and the greater the deviation of the pulse width PW from AL, the smaller the maximum velocity $v_{max}$ becomes.

Figure 5A:
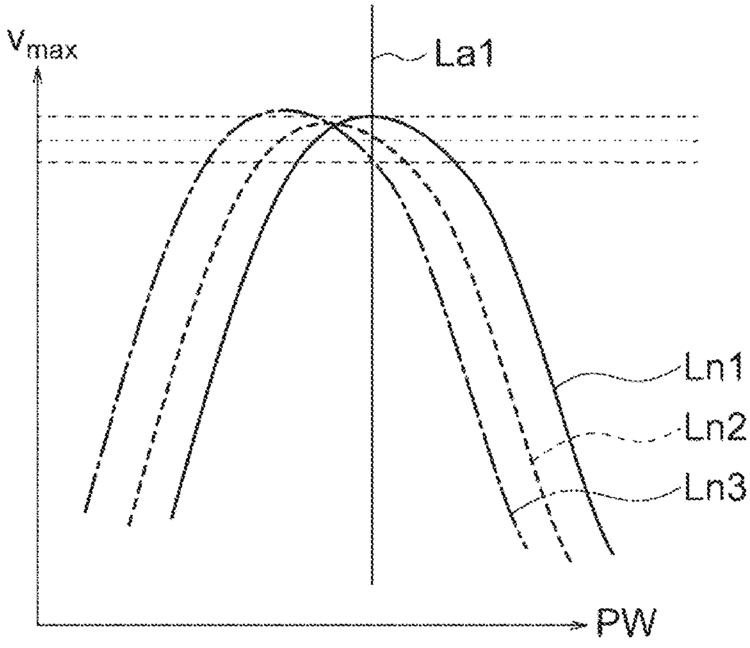
FIG. 5A is a conceptual diagram for explaining a principle used to reduce variations in liquid velocity.

FIG. 5A is a conceptual diagram illustrating the above phenomenon. In this figure, the horizontal axis represents the pulse width PW. The vertical axis represents the maximum velocity $v_{max}$ of the meniscus. Lines Ln1, Ln2, and Ln3 in the figure illustrate the relationship between the pulse width PW and the maximum velocity $v_{max}$ of the ejecting elements 15, which differ from each other.

As illustrated by each of the lines Ln1 to Ln3, the maximum velocity $v_{max}$ increases as the pulse width PW is increased. Furthermore, as the pulse width PW is increased, the maximum velocity $v_{max}$ will reach a peak and then decrease. The pulse width PW at this peak can be said to be AL.

As illustrated in the figure, multiple ejecting elements 15 may differ from each other in terms of AL. In other words, there are variations in AL. In the illustrated example, AL becomes longer in the order of the line Ln1, the line Ln2, and the line Ln3. On the other hand, the shapes of the pulses Ps (from another perspective, the pulse width PW) for ejecting droplets with the same ejection volume are the same for the multiple ejecting elements 15, for example.

Therefore, if the AL of the ejecting element 15 of the line Ln1 (with the line La1) is used as the pulse width PW, then pulse widths PW having a time length shifted from that AL will be input for the ejecting elements 15 of the lines Ln2 and Ln3. As a result, in the ejecting elements 15 of the lines Ln2 and Ln3, the maximum velocity $v_{max}$ is not maximized, and in turn, is likely to be smaller than the maximum velocity $v_{max}$ of ejecting element 15 of the line Ln1. In FIG. 5A, three dotted lines parallel to the horizontal axis indicate that the maximum velocities $v_{max}$ (intersections of the lines Ln1 to Ln3 and the line La1) of the ejecting elements 15 of the lines Ln1 to Ln3 are different from one another when using the AL of the ejecting element 15 of the line Ln1.

For the above reason, the maximum velocity $v_{max}$ varies between multiple ejecting elements 15. Since the maximum velocity $v_{max}$ is strongly correlated with the ejection velocity and ejection volume of droplets, the ejection velocity and ejection volume will vary between the multiple ejecting elements 15. As a result, for example, image quality will be degraded.

A variety of factors contribute to variations in AL, for example, design factors and manufacturing factors. From another perspective, there are differences in intended shapes and dimensions, etc., and unintended shapes and dimensions, etc.

Design factors include, for example, the previously mentioned differences in the length and/or orientation of the multiple constrictions 39 due to differences between the positions of the multiple pressurization chambers 43, and differences in the shape of the multiple partial flow channels 45 for allowing the positions of the multiple nozzles 5 to be shifted in the D2 direction from one another. Another example is differences in the rigidity of wall surfaces making up the individual flow channels 25 arising from differences between the positions of the multiple individual flow channels 25 relative to the common flow channel 23 or a channel for connecting the common flow channel 23 to the rear member 9, etc.

For example, manufacturing factors include variations in the dimensions of the multiple individual flow channels 25 that occur when holes that make up the flow channels are formed in the plates 27 by etching. More specifically, for example, the relative relationship between a prescribed part of an individual flow channel 25 and another flow channel (one of the individual flow channels 25 and/or the common flow channel 23) differs between the multiple individual flow channels 25, and as a result, the density of patterns differs between the multiple individual flow channels 25. As a result, variations occur in the dimensions due to the microloading effect. For example, manufacturing factors include variations that occur when the multiple plates 27 are heated and pressed in order to be bonded together. Specifically, for example, the temperature and/or pressure applied to the adhesive between the plates 27 differs depending on the position within the plates 27, and as a result, the dimensions and/or rigidity of the multiple individual flow channels 25 vary.

The description given here assumes that the waveform of the pulse Ps corresponding to the same ejection volume is common to the multiple ejecting elements 15. The multiple ejecting elements 15 having a common waveform may be all of the ejecting elements 15 of the head 2 (excluding unique ones as mentioned above), or may be just some of the ejecting elements 15. In the latter case, for example, the waveform of the pulse Ps may vary between rows, and the waveform may be the same within a row when the shape of the individual flow channels 25 differs between rows of the pressurization chambers 43, as already mentioned.

(5.2. Overview of Method for Reducing Variations)

Figure 6:
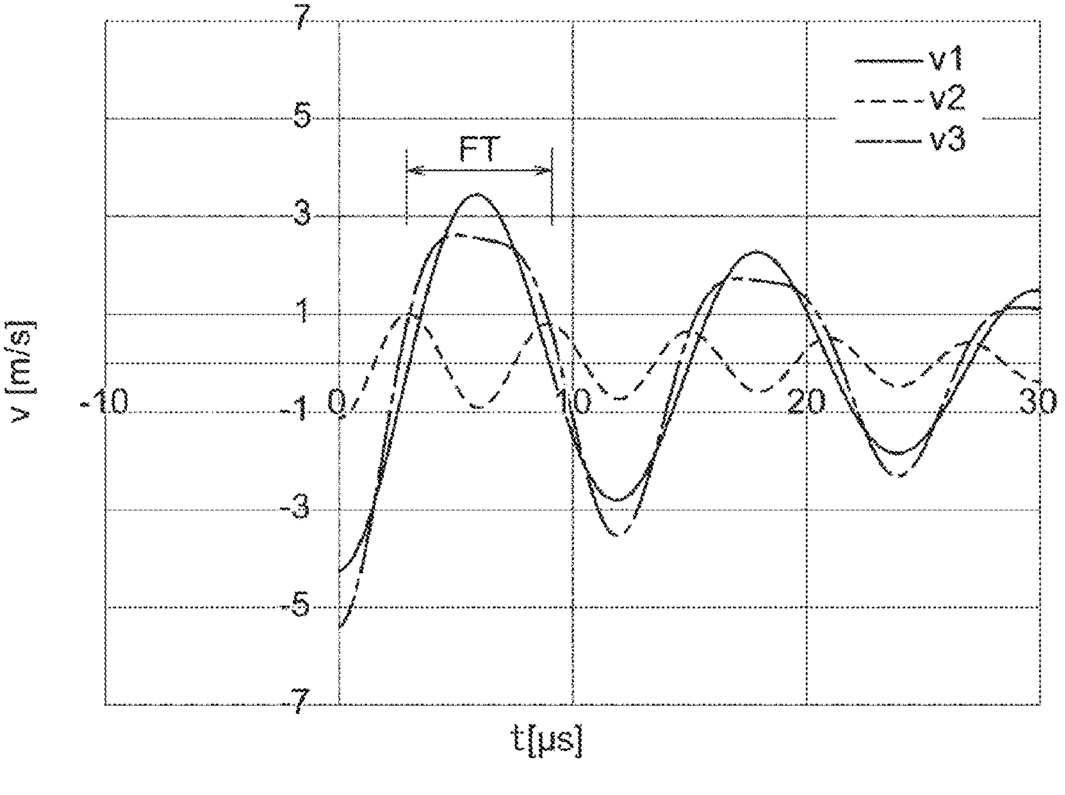
FIG. 6 is another conceptual diagram for explaining the principle used to reduce variations in liquid velocity.

FIG. 6 is a conceptual diagram for describing a method used to reduce variations in the ejection velocity caused by variations in AL as described above. In this figure, the horizontal axis represents time t (μs). The vertical axis represents the velocity v (m/s) of the meniscus. The 0, +side, and −side of the vertical axis are the same as the 0, +side, and −side of the vertical axis on the right side of FIG. 4.

This figure illustrates the changes over time of the velocity v when ejecting droplets using the pull-push method described with reference to FIG. 4. t=ω(μs) in FIG. 6 roughly corresponds to t/AL=0.5 in FIG. 4. The line associated with "v1" in the legend represents the changes over time of the velocity v of the main vibration (the natural vibration of the liquid in the individual flow channel 25). As is understood from description thus far, the velocity v1 of the main vibration oscillates with a period of 2 AL (around 12 us in the illustrated example). The first peak of the main vibration (around 6 μs) corresponds to the peak on which the rising edge of the pulse Ps is superimposed in FIG. 4 (the peak containing the maximum velocity $v_{max}$).

The liquid generates not only a natural vibration (main vibration) that depends on the overall shape and dimensions of the individual flow channel 25, but also a natural vibration (high-frequency vibration) that depends on the shape and dimensions of the partial flow channel 45. The line associated with "v2" in the legend represents the changes over time of the velocity v of the high-frequency vibration. The velocity v2 of the high-frequency vibration oscillates with the natural vibration period of the liquid in the partial flow channel 45 (around 6 μs in the illustrated example). The period of the high-frequency vibration is shorter than the period of the main vibration. The amplitude of the high-frequency vibration is smaller than the amplitude of the main vibration.

In the legend, the line associated with "v3" represents the changes over time of the velocity v of the vibration obtained when the main vibration and the high-frequency vibration are combined with each other (hereinafter referred to as the "combined vibration"). When the first peak of the main vibration (around 6 μs), when an ejection is carried out, overlaps the valley of the high-frequency vibration, a peak with a flattened top appears in the combined vibration. In other words, the changes in velocity v in the vicinity of the maximum velocity $v_{max}$ become more gradual.

Figure 5B:
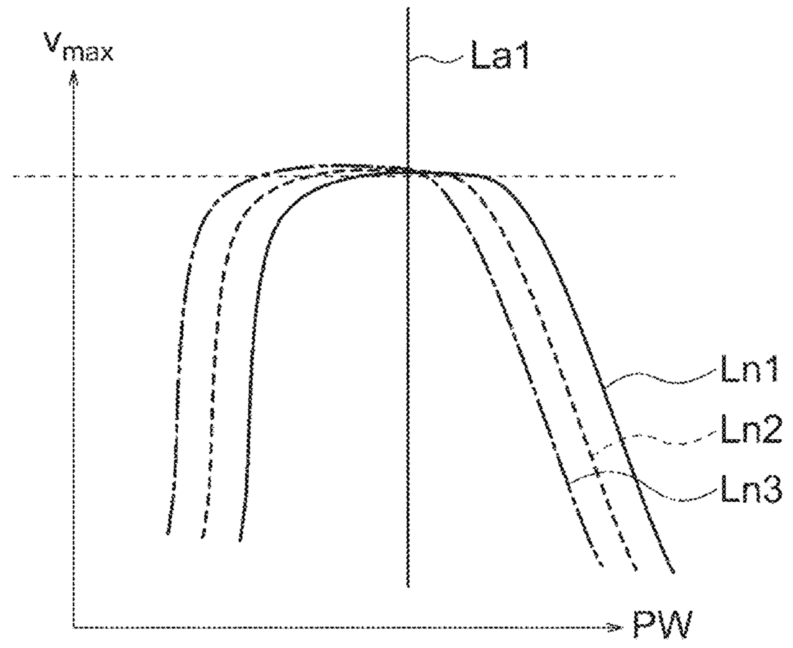
FIG. 5B is another conceptual diagram for explaining a principle used to reduce variations in liquid velocity.

FIG. 5B illustrates the relationship between the pulse width PW and the maximum velocity $v_{max}$ of the meniscus, when the main vibration and the high-frequency vibration are combined as described above, and is a diagram the same as or similar to FIG. 5A. Lines Ln1 to Ln3 in FIG. 5B represent the maximum velocity $v_{max}$ of different nozzles 5, the same as or similarly to the lines Ln1 to Ln3 in FIG. 5A. A line La1 represents the pulse width PW corresponding to the AL of the ejecting element 15 of the line Ln1, the same as or similar to the line La1 in FIG. 5A.

As can be understood from a comparison of FIG. 5A and FIG. 5B, the flattening of the top of the first peak in the combined vibration results in the top of each of the lines Ln1 to Ln3 also being flattened. In other words, in the range where the pulse width PW is equal to or close to AL (horizontal axis), the maximum velocity $v_{max}$ does not change significantly (is generally constant) even when the pulse width PW is changed. From another perspective, the lines Ln1 to Ln3 have flat tops that tend to overlap. In the range where their tops overlap, the maximum velocity $v_{max}$ is near maximum in all of the lines Ln1 to Ln3.

Therefore, for example, when a pulse width PW having a length corresponding to the AL of the line Ln1 is commonly applied to the ejecting elements 15 of the lines Ln1 to Ln3, not only is the maximum velocity $v_{max}$ in the ejecting element 15 of the line Ln1 maximum, but the maximum velocity $v_{max}$ in the ejecting elements 15 of the lines Ln2 and Ln3 also tends to be maximum or close to maximum. As a result, the maximum velocities $v_{max}$ of the ejecting elements 15 of the lines Ln1 of Ln3 tend to be close together, as indicated by the single dotted line parallel to the horizontal axis. In turn, variations in ejection velocity and/or ejection volume, which are strongly correlated with the maximum velocity $v_{max}$, are reduced.

(5.3. Consideration of Effects of Attenuation Rate)

As illustrated in FIG. 6, the velocity v1 of the main vibration has a minimum value before the first peak (t=0). The time t=0 is approximately a time point when 0.5 AL has elapsed since the falling edge of the pulse Ps, as can be understood from FIG. 4. At this time point, the velocity v2 of the high-frequency vibration also has a minimum value. That is, at the minimum value before the first peak of the main vibration, the main vibration and the high-frequency vibration are in phase with each other. Therefore, considering a simple case, when the angular frequency of the main vibration is ω1 and the angular frequency of the high-frequency vibration is ω2, a valley of the high-frequency vibration can be made to overlap the first peak of the main vibration by setting ω2/ω1 to a multiple of 2 (2 in FIG. 6) or a value close to a multiple of 2.

However, the actual main vibration is attenuated as illustrated in FIG. 6. In this case, the top of the peak of the velocity v3 of the combined vibration is more easily flattened when ω2/ω1 is slightly larger than a multiple of 2. That is, in FIG. 6, the waveform of the high-frequency vibration is shifted slightly toward the left side of the figure (toward the side where the elapsed time t is short). As a result, the velocity v1 at a point where the elapsed time t is shorter than the peak of the main vibration (before the attenuation relatively progresses) is relatively greatly reduced by the velocity v2 of the valley of the high-frequency vibration. On the other hand, the degree to which the velocity v1 at a point where the elapsed time t is longer than the peak of the main vibration (after attenuation has relatively advanced) is reduced by the velocity v2 of the valley of the high-frequency vibration is relatively small. As a result, the time t during which the tops of the peaks of the velocity v3 of the combined vibration are flattened is lengthened.

Thus, in Formula (1) mentioned above, the range of ω2/ω1 is defined in accordance with the attenuation rate γ1. In Formulas (2) and (3), the range of ω2/ω1 is defined by a range whose center is greater than 2 or 4, not by a range centered on 2 or 4.

(6. Derivation of Formulas)

(6.1. Derivation Method)

The method used to derive Formulas (1) to (3) is as follows

Specific values are substituted into Formulas (4) and (5) for A1, A2, γ1, γ2, ω1, and ω2 and the velocity v1(t) of the main vibration and the velocity v2 (t) of the high-frequency vibration are calculated. Furthermore, the velocity v3 (t) of the combined vibration is calculated from v1(t)+v2 (t). The maximum value (highest value) in the first peak in the calculated velocity v3 (t) is determined. Next, a length of time within a range of −5% of that maximum value is determined. This length of time will be referred to as FT (flat time) as indicated in FIG. 6.

If we ignore strictness, the maximum value of the first peak of the velocity v3 (t) (the maximum value of the first peak of the natural vibration) calculated as described above corresponds to the maximum velocity $v_{max}$ when the vibration is caused only by the falling edge of the pulse Ps in FIG. 4 (assuming the pulse Ps has no rising edge). In the experience of the applicant, if the variation of the maximum value of the first peak of the velocity v3 (t) is within 5%, there is a high probability that the variations of the maximum velocity $v_{max}$ obtained when the natural vibration due to the falling edge of the pulse Ps and the vibration caused by the rising edge of the pulse Ps are superimposed will fall within an acceptable range.

In addition, from the above description, for example, if the difference between the pulse width PW and AL is less than or equal to FT, the effect of this difference on the maximum velocity $v_{max}$ when the pulse Ps does have a rising edge is small. From another perspective, there is a high probability that deviations in the maximum velocity $v_{max}$ will lie within an acceptable range. Therefore, FT is directly the length of time of the part where the top of the peak of the combined natural vibration is flat, as illustrated in FIG. 6, but is an index that is strongly correlated with the length of time of the part where the top of the peak of the maximum velocity $v_{max}$ illustrated in FIG. 5B is flat (variation of pulse width PW where the top is flat).

The longer FT becomes, the more likely the tops of the peaks of the maximum velocity $v_{max}$ will overlap among the multiple ejecting elements 15, as in FIG. 5B. In other words, when a common pulse width PW is applied to multiple ejecting elements 15 having different ALs from each other, the longer FT becomes, the more greatly the probability that the maximum velocity $v_{max}$ will differ significantly among the ejecting elements 15 is reduced. From another perspective, from the viewpoint of making the maximum velocity $v_{max}$ identical among the multiple ejecting elements 15, the allowable variation of AL is increased.

The procedure for obtaining FT as described above is performed for various values of ω2/ω1. In this way, the relationship between ω2/ω1 and FT is determined. This allows, for example, the ω2/ω1 at which FT has a maximum value to be determined, or a prescribed range in which FT is greater than or equal to a prescribed size to be determined. Formulas (1) to (3) define a range of +5% around the value of ω2/ω1 at which FT has a maximum value.

Note that FT is the length of time over which v3 (t) falls within-5% of the maximum value thereof, as previously described. FT' is the length of time over which v3 (t) falls within-10% of the maximum value thereof. The inventors of the present application confirmed via calculations that the range of +5% around the value of ω2/ω1 at which FT' has a maximum value is not significantly different from the range of +5% around the value of ω2/ω1 at which FT has a maximum value. This illustrates the validity of the definition of FT (value of −5%) and the range of +5% around the maximum value of FT.

The procedure for determining FT is performed not only for various values of ω2/ω1, but also for various values of γ1/ω1 and γ2/ω1. In this way, an advantageous range of ω2/ω1 is determined in accordance with the values of the attenuation rates γ1 and γ2. Note that γ1/ω1 is the attenuation ratio of the main vibration.

The various values used in the calculations are listed below.

A1: 10 (m/s)

A2: 1.5 (m/s)

ω2/ω1: varied by 0.01 in the range from 0 to 9

γ1/ω1:0, 0.12, 0.23, or 0.46

γ2/ω1:0, 0.23, 0.46, 0.69, 0.92, or 1.15

The above values are set based on the configuration of the ejecting elements 15 specifically designed for the planned implementation. However, the various values above include hypothetical (unrealistic) values. For example, γ1/ω1=0 is a hypothetical value because this value is for the case of a non-attenuated main vibration. The above values are obtained by rounding off, at an appropriate decimal place, the values actually used in the calculations (the same or similar applies below).

(6.2. Calculation Results)

Figure 7A:
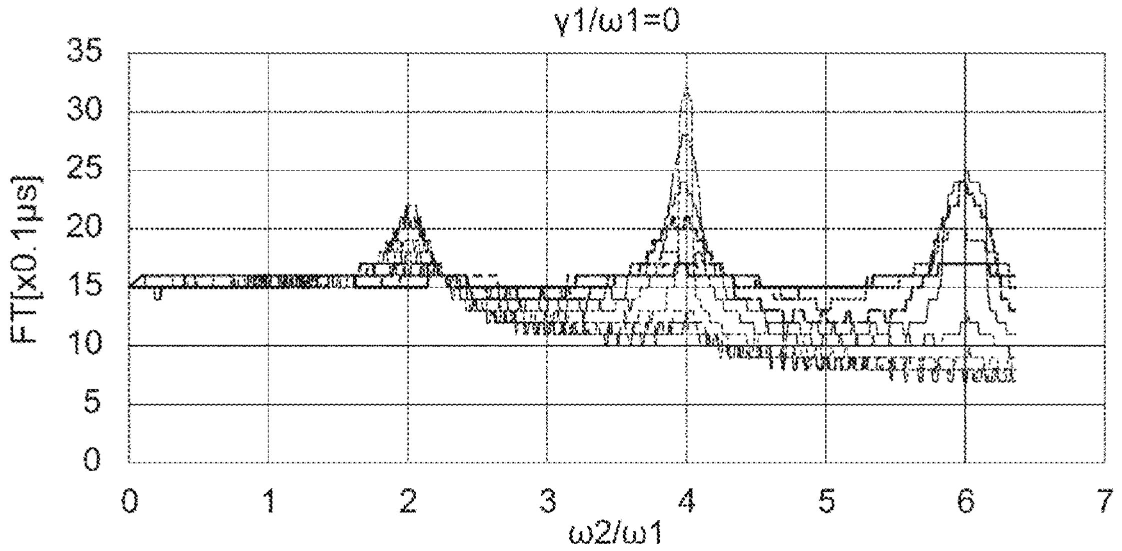
FIG. 7A is a diagram illustrating an example of the results of calculating an index related to a characteristic around the maximum value of the liquid velocity.
Figure 7B:
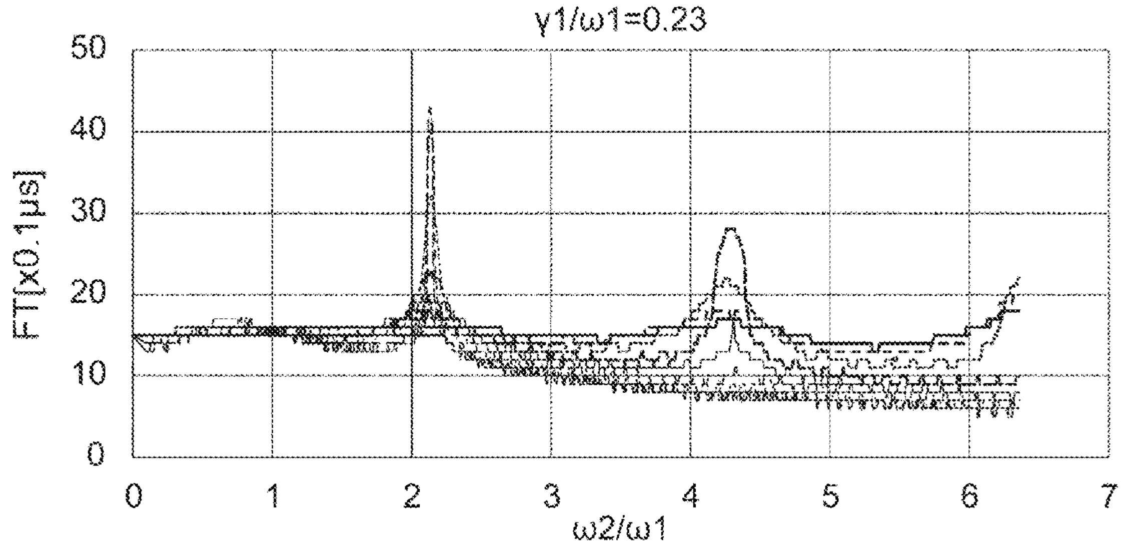
FIG. 7B is another diagram illustrating an example of results of calculating an index related to a characteristic around the maximum value of the liquid velocity.

FIGS. 7A and 7B illustrate examples of calculation results of FT. In these figures, the horizontal axis represents ω2/ω1. The vertical axis represents FT (0.1 μs). The multiple lines in the figures illustrate the relationship between ω2/ω1 and FT for multiple cases in which 12/ω1 is varied. FIG. 7A illustrates the results for the case where γ1/ω1=0. FIG. 7B illustrates the results for the case where γ1/ω1=0.23.

As illustrated in FIG. 7A, when the main vibration is not attenuated, FT reaches a maximum value when ω2/ω1 is a multiple of 2. On the other hand, as illustrated in FIG. 7B, when the main vibration is attenuated, FT reaches a maximum value when ω2/ω1 is slightly larger than a multiple of 2. The difference between the ω2/ω1 at which FT reaches a maximum value and the multiple of 2 is, for example, less than 0.5. The same or a similar trend occurs for different values of γ2/ω1.

Figure 8:
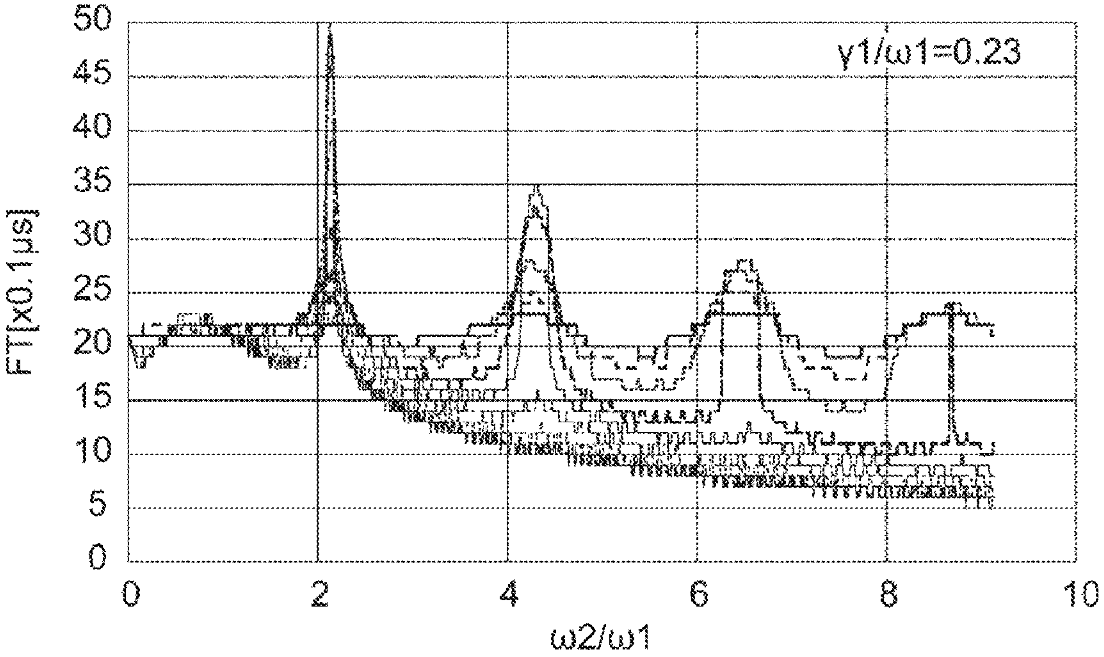
FIG. 8 is yet another diagram illustrating an example of results of calculating an index related to a characteristic around the maximum value of the liquid velocity.

FIG. 8 illustrates other examples of calculation results of FT, and is a diagram the same as or similar to FIG. 7A and FIG. 7B. FIG. 8 illustrates the results for the case where γ1/ω1=0.23, the same as or similar to FIG. 7B. However, the conditions for γ2/ω1 differ slightly from those in FIG. 7B, and the calculations are performed over a wider range than in FIG. 7B with respect to ω2/ω1.

FIGS. 9A to 9C and FIGS. 10A to 10C each illustrate a line extracted from FIG. 8 for when γ2/ω1 has a specific value. Specifically, as illustrated in each figure, these figures illustrate FT when γ2/ω1 is ω, 0.23, 0.46, 0.69, 0.92, or 1.15.

As can be understood from a comparison of these figures, the value of the multiple of 2 near the ω2/ω1 at which FT is maximum changes depending on the value of γ2/ω1. For example, when γ2/ω1 is 0 or 0.23, FT is maximum when ω2/1 is a value slightly shifted from 2. For example, when γ2/ω1 is 0.46 or 0.69, FT is maximum when ω2/ω1 is a value slightly shifted from 4. When γ2/ω1 is 0.92 or 1.15, the FT when ω2/ω1 is slightly shifted from 4 and the FT when ω2/ω1 is slightly shifted from 6 are generally equal to each other and are maximum. Thus, the larger γ2/ω1 is, the larger the value of the multiple of 2 near ω2/ω1 when FT is maximum.

In addition to the above trends, we can see that as γ2/ω1 increases, the maximum value of FT becomes smaller, and the slope of the peak including the maximum value of FT tends to become gentler. Therefore, for example, by setting γ2/ω1 to be small (for example, 0.46 or less or 0.23 or less), the maximum value of FT can be increased. For example, by setting γ2/ω1 to be relatively large (for example, 0.46 or more or 0.69 or more), fluctuations of FT when ω2/ω1 deviates from the design value can be reduced.

FIG. 11, FIGS. 12A to 12C, and FIGS. 13A to 13C are diagrams the same as or similar to FIG. 8, FIGS. 9A to 9C, and FIGS. 10A to 10C above. However, as noted in FIG. 11, the results are illustrated for γ1/ω1=0.46.

As illustrated in these figures, we could confirm roughly the same or a similar trend in the case of γ1/ω1=0.46 as in the case of γ1/ω1=0.23. For example, the trend that the larger γ2/ω1 is, the larger the value of the multiple of 2 near ω2/ω1 when FT is maximized could be confirmed.

Figure 11:
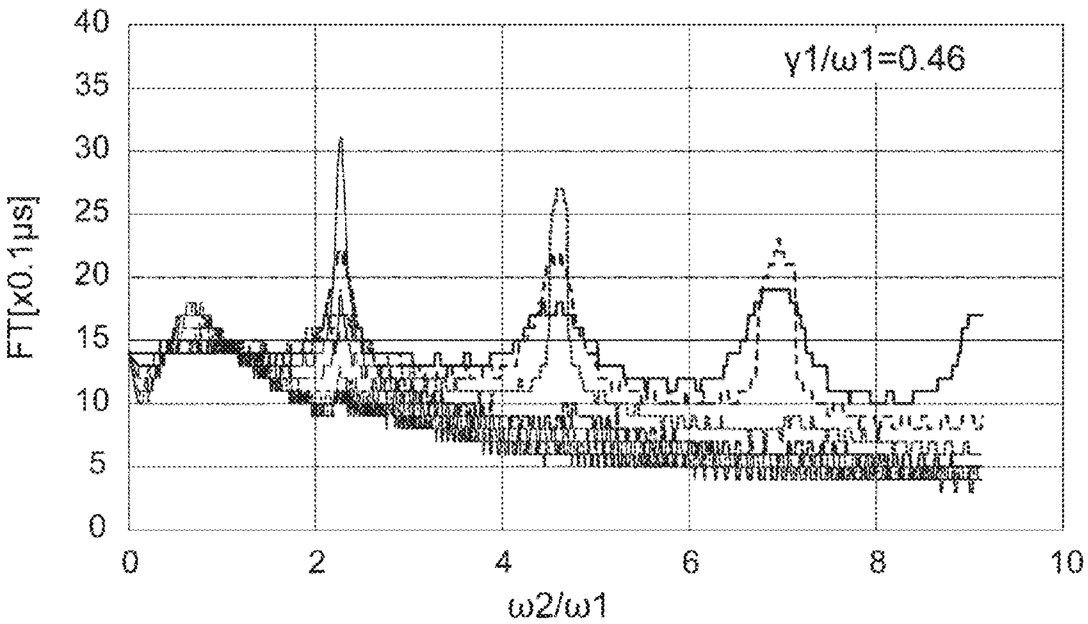
FIG. 11 is yet another diagram illustrating an example of results of calculating an index related to a characteristic around the maximum value of the liquid velocity.
Figure 12A:
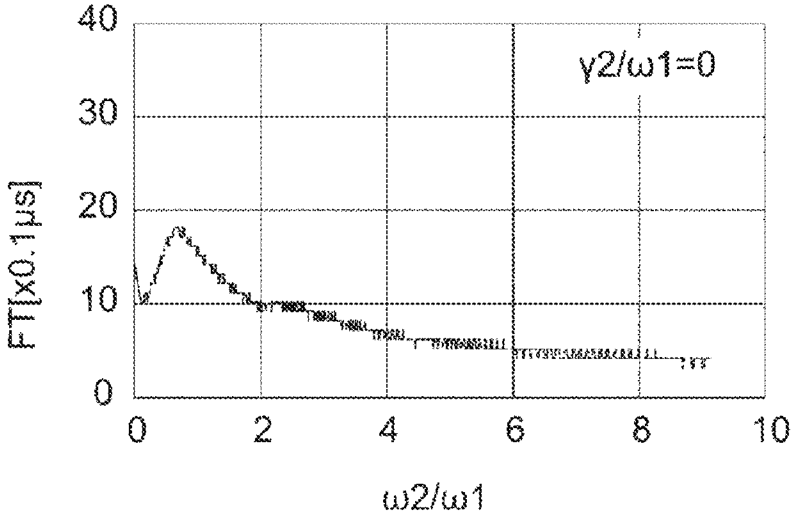
FIG. 12A is a diagram illustrating a portion (case where γ2/ω1=0.00) extracted from FIG. 11.
Figure 12B:
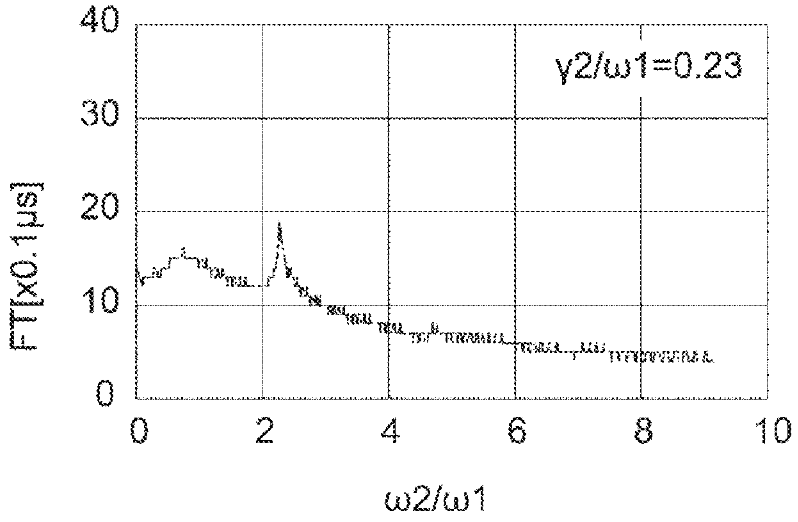
FIG. 12B is a diagram illustrating a portion (case where γ2/ω1=0.23) extracted from FIG. 11.
Figure 12C:
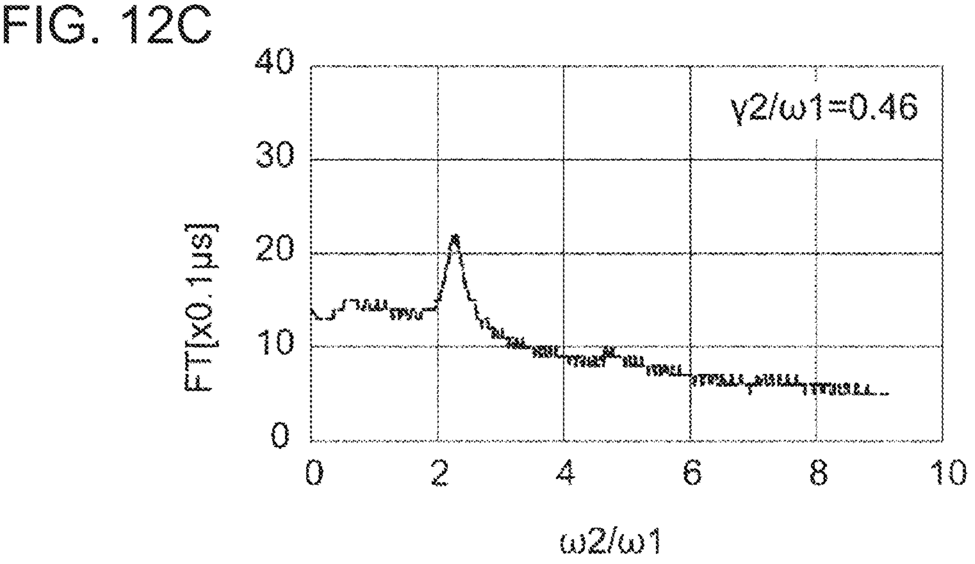
FIG. 12C is a diagram illustrating a portion (case where γ2/ω1=0.46) extracted from FIG. 11.
Figure 13A:
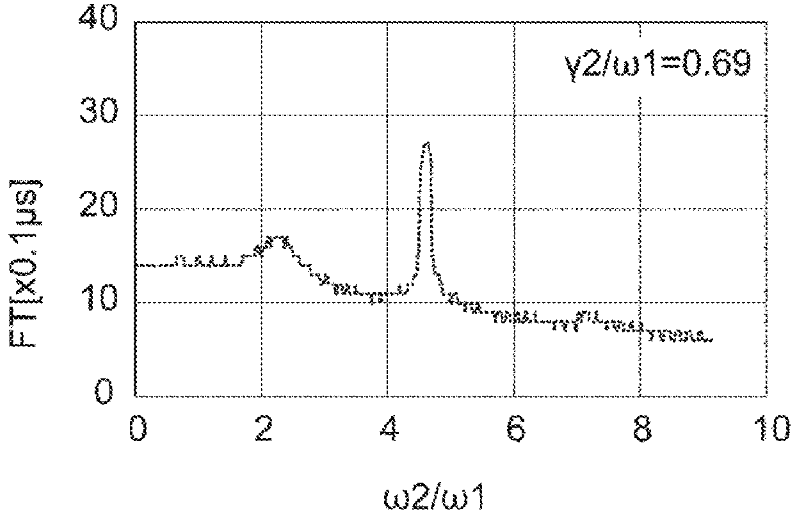
FIG. 13A is a diagram illustrating a portion (case where (γ2/ω1=0.69) extracted from FIG. 11.
Figure 13B:
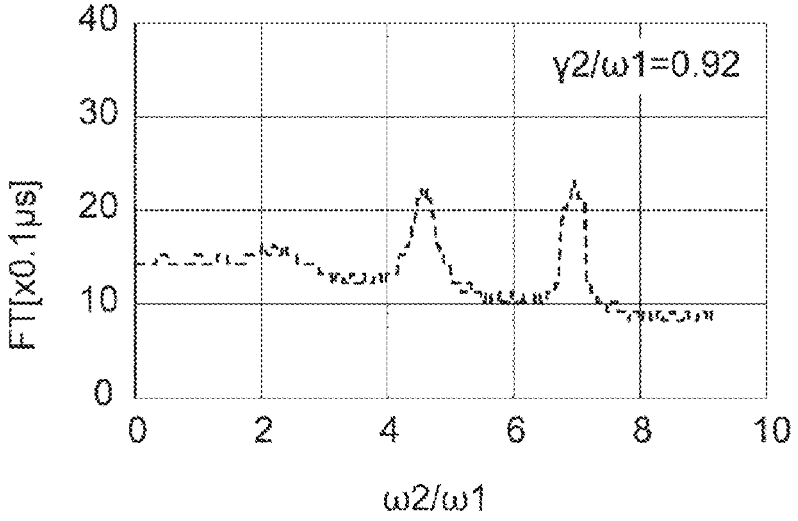
FIG. 13B is a diagram illustrating a portion (case where γ2/ω1=0.92) extracted from FIG. 11.
Figure 13C:
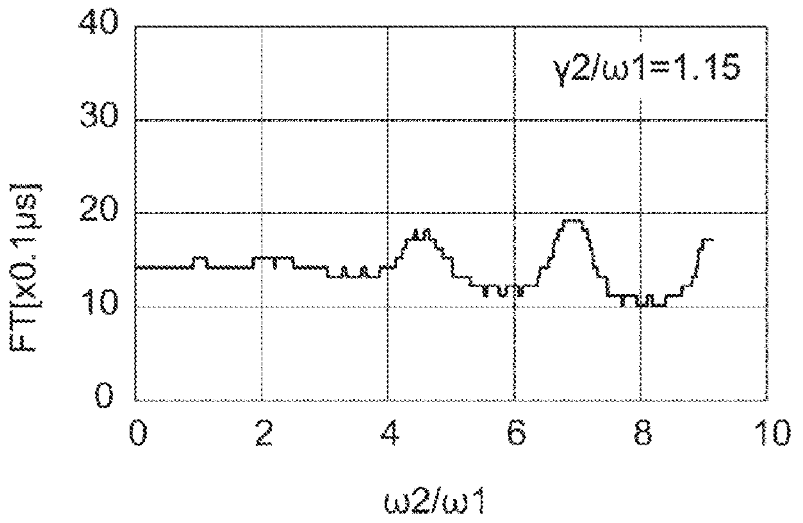
FIG. 13C is a diagram illustrating a portion (case where γ2/ω1=1.15) extracted from FIG. 11.

As can be understood from a comparison between FIG. 8 and FIG. 11, the larger γ1/ω1 is, the greater the amount by which ω2/ω1, at which FT has a maximum value, deviates from a multiple of 2. This trend can be explained using the waveforms illustrated in FIG. 6. Specifically, the larger γ1 is, the smaller the first peak of the main vibration (v1) is on the right side of the figure (the side with longer elapsed time t) compared to the left side of the figure, and therefore increasing the shift of the high-frequency vibration (v2) toward the left side of the figure can result in FT being longer.

As illustrated in FIGS. 8 and 11, FT has maximum values at positions that are slightly shifted from each multiple of 2 (2, 4, 6, and 8). In addition, the larger the multiple of 2, the larger the deviation between the multiple of 2 and the ω2/ω1 at which FT has a maximum value.

From the above description, the ω2/ω1 at which FT is at a maximum value has a correlation with γ1/ω1 and multiples of 2. The value of γ2/ω1 has essentially no effect on the ω2/ω1 at which FT is at a maximum value. Therefore, when n is a positive integer, the formula for finding the ω2/ω1 at which FT reaches a maximum value from γ1/ω1 and 2n is derived by performing multiple regression analysis with γ1/ω1 and n (or 2n, which is a multiple of 2 from another perspective) as independent variables and ω2/ω1 at which FT reaches a maximum value as a dependent variable.

Combinations of n, γ1/ω1, and ω2/ω1 at which FT reaches a maximum value used to derive the formula are as follows.

When γ1/ω1=0, (n=1, ω2/ω1=2), (n=2, ω2/ω1=4), (n=3, ω2/ω1=6)

When γ1/ω1=0.115473, (n=1, ω2/ω1=2.07), (n=2, ω2/ω1=4.16), (n=3, ω2/ω1=6.29)·

When γ1/ω1=0.230947, (n=1, ω2/ω1=2.14), (n=2, ω2/ω1=4.34), (n=3, ω2/ω1=6.49)·

When γ1/ω1=0.461894, (n=1, ω2/ω1=2.28), (n=2, ω2/ω1=4.65), (n=3, ω2/ω1=6.95)

The following formula was then obtained as an equation for finding ω2/ω1 at which FT reaches a maximum value based on γ1/ω1 and n.

$$\omega 2/\omega 1 = 2n(1 + 0.32 \times \gamma 1/\omega 1) \quad (6)$$

Formula (1) specifies the +5% range on the right side of Formula (6) above.

Formulas (2) and (3) directly use the value of ω2/ω1 μsed to derive Formula (6) above and specify a range of +5% of that value. This is described more specifically below.

Formula (2) is obtained as follows.

$$2.07 \times 0.95 < \omega 2/\omega 1 < 2.28 \times 1.05$$

Here, 2.07 and 2.28 are the minimum value and maximum value of ω2/ω1 when γ1 is non-zero and n is 1. The former is for when γ1/ω1=0.12 and the latter is for when γ1/ω1=0.46.

Formula (3) is obtained as follows.

$$4.16 \times 0.95 < \omega 2/\omega 1 < 4.65 \times 1.05$$

Here, 4.16 and 4.65 are the minimum value and maximum value of ω2/ω1 when γ1 is non-zero and n is 2. The former is for when γ1/ω1=0.12 and the latter is for when γ1/ω1=0.46.

(6.3. Amplitude)

Formulas (1) to (3) are based on results of calculations assuming specific values for A1 and A2. However, even if A1 and A2 take other values, the fact remains that variations in the maximum velocity $v_{max}$ of the meniscus caused by variations in AL are easily reduced by setting ω2/ω1 to a value in the range centered on a value slightly larger than 2n. In other words, even if A1 and A2 take other values, the best effect may not necessarily be obtained, but a better effect may be obtained. Therefore, A1 and A2 do not need to have the values used in the calculation. However, for A1 and A2, if the ratio A1/A2 is the same, the above calculation results will give the same values. Thus, A1/A2 may lie within a range of +20%, +10%, or +5% of that value.

In addition to or instead of A1/A2, the ratio (B2/B1) of a peak intensity B2 of the amplitude spectrum of the velocity v2 of the high-frequency vibration to a peak intensity B1 of the amplitude spectrum of the velocity v1 of the main vibration may be kept within a specified range. This is described more specifically below.

Figure 14:
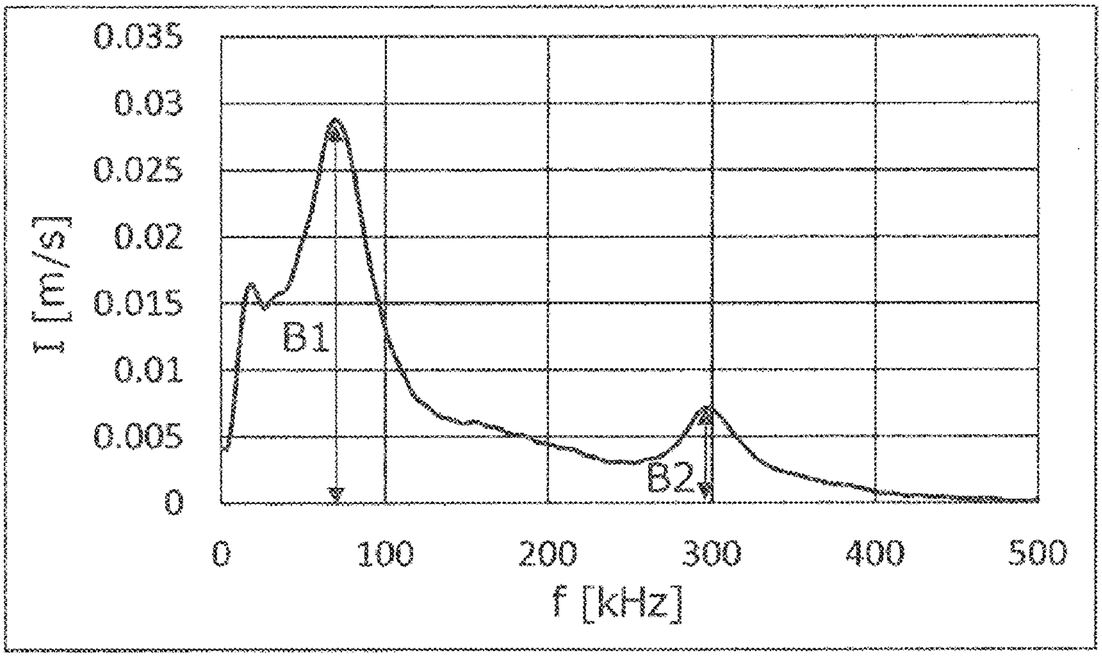
FIG. 14 is a diagram illustrating an example of amplitude spectrum.

FIG. 14 is a diagram illustrating an example of the amplitude spectrum of velocity in the vibration of a meniscus. In this figure, the horizontal axis represents frequency f (kHz). The vertical axis represents an intensity I of the spectrum, and more specifically, an amplitude A (m/s) of the velocity.

As illustrated in this figure, the actual vibration of the meniscus is a combination of not only the main vibration and the high-frequency vibration, but also a combination of vibrations of various frequencies (or can be regarded that way). The intensity is higher at and near frequencies corresponding to the main vibration and the high-frequency vibration (see frequencies relating to B1 and B2).

The maximum value in the part where the intensity is high as described above will be referred to as the peak intensity. The peak intensity relating to the main vibration is denoted B1, and the peak intensity relating to the high-frequency vibration is denoted B2. In this case, B2/B1 may be, for example, greater than or equal to 0.19 and less than or equal to 0.25. This range was derived by the applicant based on multiple experiments and multiple simulations carried out under various different conditions.

(7. Method for Adjusting Parameters)

The values of any of the parameters ω1, ω2, and γ1 may be adjusted to satisfy Formulas (1) to (3). The values of the parameters depend on various factors. The various factors include, for example, the shape, dimensions, and rigidity of the inner walls (including the actuators 17) of each part of the individual flow channels 25, as well as the density, elastic modulus, and viscosity of the liquid in the individual flow channels 25. Any of these factors may be adjusted when adjusting the values of the parameters.

For example, ω1 and γ1 (from another perspective, the schematic configuration of the individual flow channel 25), which are affected by the entirety of the individual flow channel 25, may be set in accordance with basically the same or similar design concepts as used to date. The value of ω2 may be adjusted by adjusting the shape and dimensions of the partial flow channel 45, so that Formulas (1) to (3) are satisfied.

In more detail, for example, the vibration of the liquid in the partial flow channel 45 can be approximated or estimated based on the known vibration of a liquid in a closed tube. The closed tube is cylindrical in shape with one end (the end portion on the nozzle 5 side) closed and the other end (the end portion on the pressurization chamber 43 side) open. The natural vibration inside a closed tube produces a stationary wave with the closed end acting as a node and the open end acting as an anti-node. That is, the wavelength of the natural vibration is roughly four times the length of the closed tube. On the other hand, there is a known relationship λ=c×2π/ω between wavelength λ, acoustic velocity c, and angular frequency ω. Therefore, ω2 can be adjusted by changing the length of the partial flow channel 45. In the actual design, well-known open end corrections may be taken into account.

When n is 1 or 2, we can say that ω2/ω1 is relatively small. In this case, the partial flow channel 45 may be relatively long. For example, the length of partial flow channel 45 may be greater than the sum of the length of pressurization chamber 43 in the flow direction (maximum length in a planar direction) and the length of the constriction 39 in the flow direction (maximum length in a planar direction). The thickness (height) of the common flow channel 23 may be increased, thereby resulting in a longer length for the partial flow channel 45. The length of the partial flow channel 45 described above may be the length of the centerline of the channel (a line passing through the center of the cross-section). The length of the individual flow channel 25 may be, for example, the length of the part extending to the nozzle 5 side from the constriction 39, the length of the part extending to the nozzle 5 from the connection portion 37, or the length to the nozzle 5 from position of the connection to the common flow channel 23.

The length of the partial flow channel 45 may be adjusted by bending the partial flow channel 45. In this case, the length of the partial flow channel 45 can be adjusted without changing the thickness of the flow channel member 19.

In addition to adjusting the length of the partial flow channel 45, ω2 (or another parameter) can be adjusted using various methods. For example, as understood from well-known open end corrections, ω2 may be adjusted by changing the wavelength of the high-frequency vibration by changing the diameter of the partial flow channel 45. For example, γ1/ω1 may be adjusted by changing the physical properties of the liquid (i.e., changing the type of liquid that is anticipated to be used).

Adjustment of γ1, ω1 and ω2 in Formulas (1) to (3) has been described above. When ¥2, A2/A1, and/or B2/B1 are adjusted, any of the various factors affecting γ2, A2/A1, and/or B2/B1 may also be adjusted. Factors affecting γ2 include, for example, the shape and dimensions of the partial flow channel 45 and the physical properties of the liquid. Factors affecting A2/A1 and/or B2/B1 include those listed as factors affecting ω1, ω2 and γ1 (previously mentioned).

(8. Method of Determining Parameters)

Whether or not Formulas (1) to (3) are satisfied may be determined using various methods. In other words, the values of the various parameters in Formulas (1) through (3) may be determined using various methods. Hereafter, an example of this will be described.

For the head 2 to be measured, an experiment is performed in which the drive signal Sg1 with a falling edge (but no rising edge) of the pulse Ps is input to the actuator 17. The velocity of the meniscus is measured using a laser Doppler vibrometer. In the measurement, the laser is irradiated to the meniscus from the outside via the nozzle 5. The frequency of the reflected laser is then detected. As a result, variations in the velocity of the meniscus over time (waveform of vibration from another perspective) are obtained, as illustrated in FIG. 6.

The obtained waveform includes waveforms at various frequencies, such as a waveform due to a main vibration and a waveform due to a high-frequency vibration. This waveform is separated into waveforms for each frequency by performing a Fourier transform (for example, FFT (fast Fourier transform)). In this way, the respective waveforms of the main vibration and high-frequency vibration are obtained. The amplitude (A1 or A2), the attenuation rate (γ1 or γ2), and the angular frequency (ω1 or ω2) are then determined so that the functions in Formulas (4) and (5) are applied to each waveform. For example, the Fourier transformed and squared spectrum of the attenuated vibration follows a Lorentz function distribution near the peak, and this can be used to obtain the spectrum. Specifically, the intensity X (f) near the frequency f of the peak of the main vibration of Formula (1) is expressed by the following equation, which can be fitted to obtain the amplitude A1, the attenuation rate γ1, and the angular frequency ω1. The parameters for the high-frequency vibration can be obtained in the same or a similar manner.

$$|X(f)|^2 = A1^2 / \left(4 \times (f - \omega 1/2\pi)^2 + (\gamma 1/\pi)^2\right)$$

The amplitude, attenuation rate, and angular frequency may be determined as follows. For example, the absolute value of the first valley (the minimum at t=0 in FIG. 6) may be adopted as the amplitude. The attenuation rate may be calculated using the following equation when the values of two adjacent maxima (or two adjacent minima) are γ1 and γ2, and the time points when γ1 and γ2 are obtained are t1 and t2.

$$\gamma = \ln(y1 / y2) / (t2 - t1)$$

The angular frequency may be calculated using the following equation using t1 and t2 above.

$$\omega = 2\pi(t2 - t1)$$

B2/B1 may be determined, for example, as follows. When a Fourier transform is performed as described above, the spectrum can be obtained as illustrated in FIG. 14. The highest of the maximum values of the intensity is defined as a peak intensity B1. On the high-frequency side from the peak intensity B1, the maximum value of the intensity that is next highest to the peak intensity B1 is defined as a peak intensity B2. Of course, the peak intensities B1 and B2 may be determined after eliminating noisy maxima as appropriate.

The frequency of the peak intensity B1 is approximately ω½π, but does not necessarily coincide with this value. In the same or a similar manner, the frequency of the peak intensity B2 is approximately ω2/2π, but does not necessarily coincide with this value. In addition, B2/B1 is close to A2/A1, but does not necessarily coincide with this value.

(9. Summary of Embodiment)

As described above, in an embodiment, the liquid ejection head 2 includes the flow channel member 19 and the actuators 17. The flow channel member 19 includes the individual flow channels 25 that accommodate liquid. Each individual flow channel 25 includes the pressurization chamber 43, the partial flow channel 45 extending from the pressurization chamber 43, and the nozzle 5 opening to the outside at the end portion of the partial flow channel 45 on the opposite side from the pressurization chamber 43. Each actuator 17 applies a pressure to the corresponding pressurization chamber 43. The attenuation rate of the natural vibration (main vibration) of the liquid in the individual flow channel 25 is γ1 (rad/s). An angular frequency of the main vibration is ω1 (rad/s). The angular frequency of the natural vibration (high-frequency vibration) of the liquid in the partial flow channel 45 is ω2 (rad/s). n is a positive integer. At this time, at least one of the previously mentioned Formulas (1) to (3) is satisfied.

From another perspective, in an embodiment, a liquid ejection device (printer 1) includes the head 2 as described above and the moving unit 85 that moves the head 2 and the recording medium relative to each other.

Therefore, for example, as discussed above, the tops of the peaks of the natural vibration of the velocity of the meniscus can be flattened (see FIG. 6) and, in turn, the effect of changes in the pulse width PW (from another perspective, the deviation between AL and PW) on the maximum velocity $v_{max}$ of the meniscus can be reduced (FIGS. 5A and 5B). As a result, variations in the maximum velocity $v_{max}$ of the meniscus caused by variations in the AL of the multiple ejecting elements 15 can be reduced. In turn, for example, variations in ejection velocity and/or ejection volume that correlate to the maximum velocity $v_{max}$ can be reduced and image quality can be improved.

For ω2 and ω1, in light of the principles used to reduce variations, the ratio between the two, ω2/ω1, has an effect and not the absolute values (rad/s). Therefore, in principle, ω2 and ω1 take any values when Formulas (1) to (3) are applied.

γ1/ω1 is realistically greater than ω. When γ1/ω1 is greater than 1, the velocity of the meniscus does not oscillate, and the principle of the pull-push method do not hold. Given these facts, the amount of overlap between the range of values of γ1/ω1 μsed in the calculations and the realistic range of values of γ1/ω1 is large. In other words, when applying Formulas (1) to (3), the values of γ1/ω1 are not limited to the values used in the calculations. However, the value of γ1/ω1 may be limited to 0.46 or less, or rounded off to 0.5 or less (including 0.54 or less).

Figure 9A:
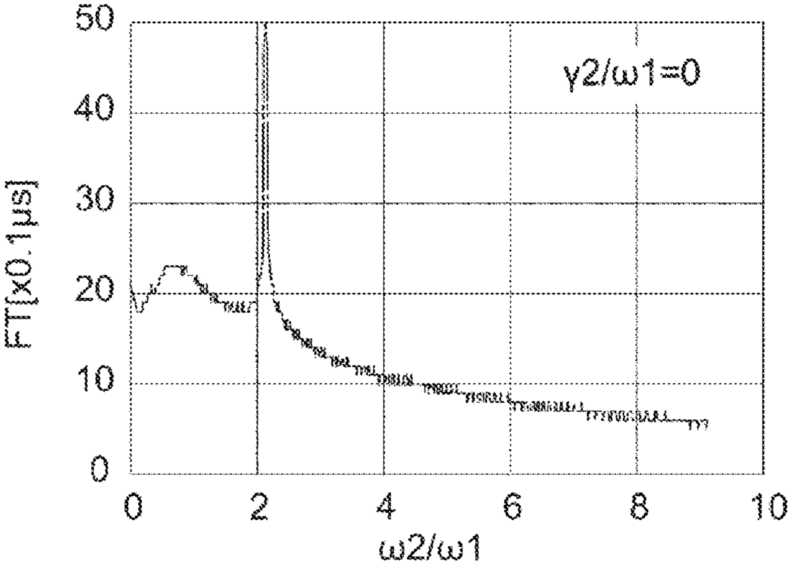
FIG. 9A is a diagram illustrating a portion (case where γ2/ω1=0.00) extracted from FIG. 8.
Figure 9B:
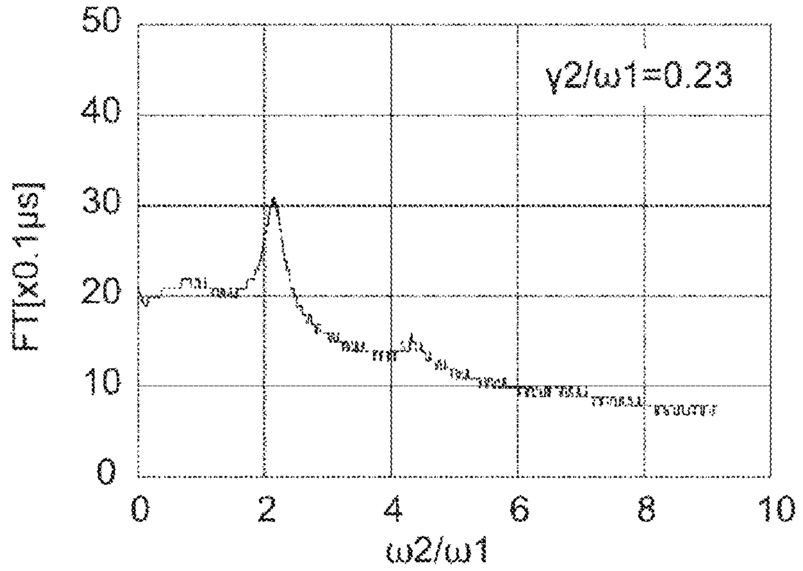
FIG. 9B is a diagram illustrating a portion (case where γ2/ω1=0.23) extracted from FIG. 8.
Figure 9C:
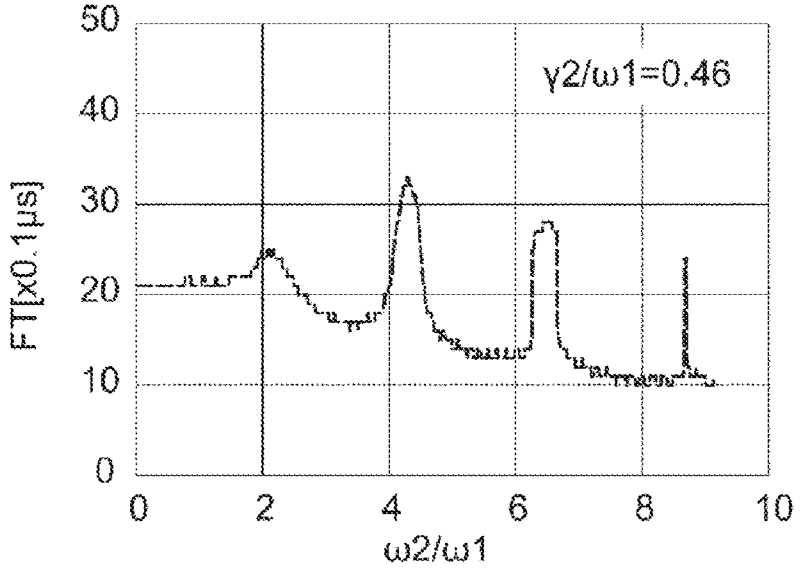
FIG. 9C is a diagram illustrating a portion (case where γ2/ω1=0.46) extracted from FIG. 8.
Figure 10A:
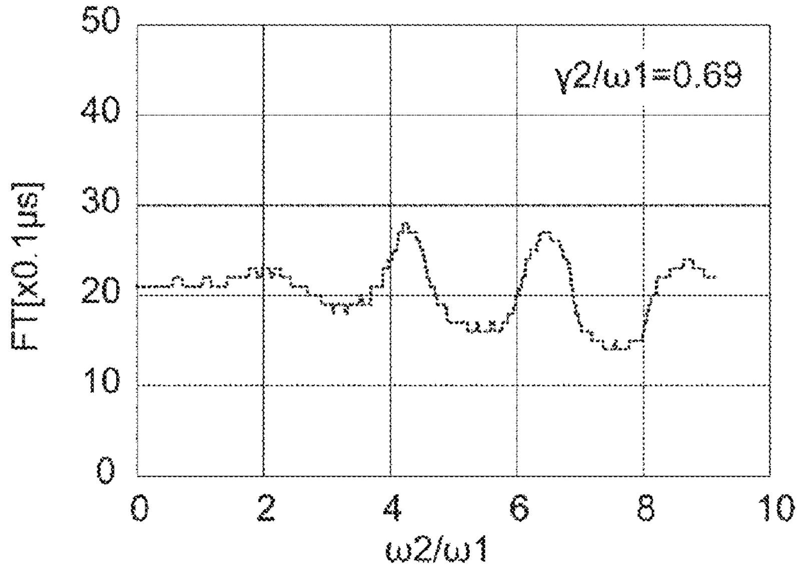
FIG. 10A is a diagram illustrating a portion (case where γ2/ω1=0.69) extracted from FIG. 8.
Figure 10B:
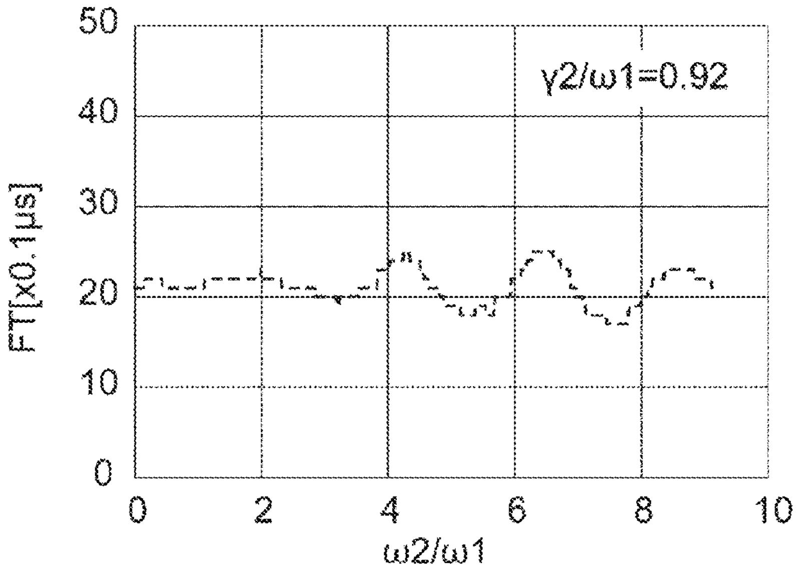
FIG. 10B is a diagram illustrating a portion (case where γ2/ω1=0.92) extracted from FIG. 8.
Figure 10C:
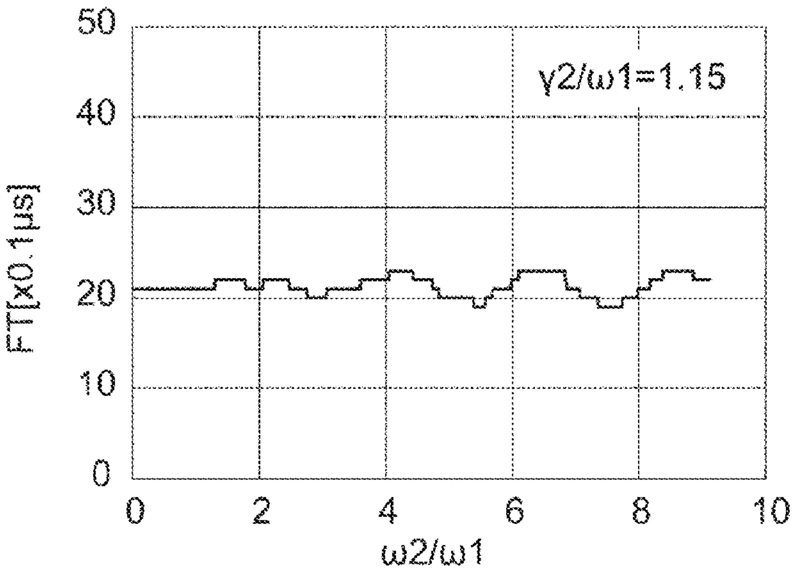
FIG. 10C is a diagram illustrating a portion (case where γ2/ω1=1.15) extracted from FIG. 8.

The small effect of γ2/ω1 on the validity of Formulas (1) to (3) is illustrated in FIG. 9A to FIG. 9C. In other words, the absolute values of γ2/ω1 and γ2 (rad/s) may be any values when applying Formulas (1) to (3).

The physical properties of the liquid (from another perspective, the type of liquid) affect whether or not Formulas (1) to (3) are satisfied. However, the head 2 satisfying the requirements of Formulas (1) to (3) does not need to include liquid as a constituent requirement. In other words, whether the technology of the present disclosure is applicable to the head 2 which is in circulation without being filled with a liquid may be determined. In general, the head 2 is configured to perform as intended, as required by the specifications, or as optimal when a so-called genuine ink is used. Thus, through analysis or experimentation, the physical properties of the liquid intended to be utilized in the head 2 can be identified based on the configuration of the head 2. In other words, whether or not Formulas (1) to (3) are satisfied can be determined regardless of the presence or absence of liquid. However, the physical properties of the liquid may be determined from specifications or instructions. In contrast to the above, whether or not Formulas (1) to (3) are satisfied for the head 2 filled with liquid may be determined.

Formulas (1) to (3) may be satisfied for any number of ejecting elements 15 among the multiple ejecting elements 15 of the head 2. For example, the equations may be satisfied for all of the multiple ejecting elements 15 of the head 2, or for two or more of and some of the ejecting elements 15. The some may be, for example, less than 50%, 50% or more, or 80% or more.

In the above description, the effects were described from the viewpoint of variations among the multiple ejecting elements 15. Focusing on one ejecting element 15, we can say that an effect of reducing the difference (error) between the intended maximum velocity $v_{max}$ and the actual maximum velocity $v_{max}$ caused by a discrepancy between the pulse width PW and AL is achieved. From this perspective, the number of ejecting elements 15 included in the head 2 may be as few as one.

n may be 1 or 2.

In this case, as illustrated in FIGS. 8 to 13C, for example, the maximum value of FT tends to be large, depending on the value of γ2/ω1. As a result, the above-mentioned effect of reducing variations is improved.

γ1/ω1 may be set to 0.46 or less.

In this case, for example, as already mentioned comparing FIG. 8 and FIG. 11, the smaller γ1/ω1 is, the more easily FT can be increased, and this facilitates obtaining the effect of increasing FT. Since the value of γ1/ω1 when Formulas (1) to (3) are obtained is adopted, there is a high probability that the effect of increasing FT can be achieved.

When the attenuation rate of the natural vibration of the liquid in the partial flow channel 45 is γ2 (rad/s), γ2/ω1 may be 1.15 or less, preferably 0.92 or less, and even more preferably 0.46 or less.

In this case, for example, as already mentioned comparing FIGS. 9A to 10C, the smaller γ2/ω1 is, the more easily FT can be increased, and this facilitates obtaining the effect of increasing FT. Since the value of γ2/ω1 when Formulas (1) to (3) are obtained is adopted, there is a high probability that the effect of increasing FT can be achieved.

B2/B1, which is the ratio of the peak intensity B2 of the amplitude spectrum of the velocity of the natural vibration (high-frequency vibration) of the liquid in the partial flow channel 45 to the peak intensity B1 of the amplitude spectrum of the velocity of the natural vibration (main vibration) of the liquid in the individual flow channel 25, may be set to greater than or equal to 0.19 and less than or equal to 0.25.

In this case, for example, high-frequency vibration of an intensity described above is combined with the main vibration in order to further reduce variations in ejection velocity of droplets among the multiple ejecting elements 15. When B2/B1 is greater than or equal to 0.19, the high-frequency vibration has a proper effect on ejection. When B2/B1 is less than or equal to 0.25, the effect of the high-frequency vibration on ejection is not too large.

The head 2 may further include the drivers 13 that drive the actuators 17 using a pull-push method.

In this case, for example, the added value of the head 2 is enhanced. The above mentioned effects can be achieved using the pull-push method driving.

In an embodiment described above, the printer 1 is an example of a liquid ejection device. The printing paper P is an example of a recording medium.

Techniques according to the present disclosure are not limited to the above embodiments and may be implemented in the form of various modes.

The driving method of the actuators may be any method so long as the method generates the natural vibration of the main vibration and applies pressure to the liquid in synchronization with the natural vibration. Therefore, although typically a pull-push method is employed, a driving method that improves on the pull-push method, or a driving method that is difficult to regard as a pull-push method, may be employed.

The liquid ejection head may include collection channels that collect liquid from the partial flow channels. Collection channels, for example, contribute to reducing the probability of liquid being retained in the partial flow channels. This reduces the probability of the viscosity of the liquid in the nozzles and in the partial flow channels becoming high due to evaporation of the solvent of the liquid near the nozzles, for example.

Actuators are not limited to unimorph or bimorph actuators. For example, the actuators may be vertical piezoelectric devices that are configured by stacking electrode layers and a piezoelectric layer and that transmit contraction and expansion directly to a vibration plate.

The liquid ejection device may move the recording medium and the head relative to each other by moving the head using a robot or the like. The entirety of the liquid ejection device may be held and moved by the user's hand and moved relative to the recording medium. Liquid ejection devices are not limited to those that deposit ink on paper or cloth, etc., and may also be used to deposit paint on car bodies. In other words, "recording medium" may be given a broad interpretation.

REFERENCE SIGNS

1 liquid ejection head, 5 nozzle, 17 actuator, 19 flow channel member, 25 individual flow channel, 43 pressurization chamber, 45 partial flow channel

The invention claimed is:

1. A liquid ejection head comprising:
a flow channel member including
an individual flow channel configured to accommodate a liquid, the individual flow channel including
a pressurization chamber,
a nozzle comprising an opening at a surface of the flow channel member, and
a partial flow channel is between the pressurization chamber and the nozzle; and
an actuator configured to apply pressure to the pressurization chamber,
wherein when an attenuation rate of a natural vibration of the liquid in the individual flow channel is γ1 (rad/s), an angular frequency of the natural vibration of the liquid in the individual flow channel is ω1 (rad/s), the angular frequency of the natural vibration of the liquid in the partial flow channel is ω2 (rad/s), and n is a positive integer, a formula $$0.95 \times 2n(1 + 0.32 \times \gamma 1/\omega 1) \leq \omega 2/\omega 1 \leq 1.05 \times 2n(1 + 0.32 \times \gamma 1/\omega 1)$$

is satisfied.

2. The liquid ejection head according to claim 1, wherein n is 1 or 2.

3. The liquid ejection head according to claim 1, wherein when an attenuation rate of the natural vibration of the liquid in the individual flow channel is γ1 (rad/s), γ1/ω1 is 0.46 or less.

4. The liquid ejection head according to claim 1, wherein when an attenuation rate of the natural vibration of the liquid in the partial flow channel is γ2 (rad/s), γ2/ω1 is 1.15 or less.

5. The liquid ejection head according to claim 1, wherein a ratio of a peak intensity of an amplitude spectrum of a velocity of the natural vibration of the liquid in the partial flow channel to a peak intensity of an amplitude spectrum of a velocity of the natural vibration of the liquid in the individual flow channel is greater than or equal to 0.19 and less than or equal to 0.25.

6. The liquid ejection head according to claim 1, further comprising:
a driver configured to drive the actuator using a pull-push method.

7. A liquid ejection device comprising:
the liquid ejection head according to claim 1; and
a moving unit configured to move the liquid ejection head and a recording medium relative to each other.

8. A liquid ejection head comprising:
a flow channel member including
an individual flow channel configured to accommodate a liquid, the individual flow channel including
a pressurization chamber,
a nozzle comprising an opening at a surface of the flow channel member, and
a partial flow channel is between the pressurization chamber and the nozzle; and
an actuator configured to apply pressure to the pressurization chamber,
wherein when an angular frequency of a natural vibration of the liquid in the individual flow channel is ω1 (rad/s) and the angular frequency of the natural vibration of the liquid in the partial flow channel is ω2 (rad/s), a formula $$1.97 \leq \omega 2/\omega 1 \leq 2.39 \text{ or}$$

$$3.95 \leq \omega 2/\omega 1 \leq 4.88$$

is satisfied.

9. The liquid ejection head according to claim 8, wherein n is 1 or 2.

10. The liquid ejection head according to claim 8, wherein when an attenuation rate of the natural vibration of the liquid in the individual flow channel is γ1 (rad/s), γ1/ω1 is 0.46 or less.

11. The liquid ejection head according to claim 8, wherein when an attenuation rate of the natural vibration of the liquid in the partial flow channel is γ2 (rad/s), γ2/ω1 is 1.15 or less.

12. The liquid ejection head according to claim 8, wherein a ratio of a peak intensity of an amplitude spectrum of a velocity of the natural vibration of the liquid in the partial flow channel to a peak intensity of an amplitude spectrum of a velocity of the natural vibration of the liquid in the individual flow channel is greater than or equal to 0.19 and less than or equal to 0.25.

13. The liquid ejection head according to claim 8, further comprising:
a driver configured to drive the actuator using a pull-push method.

14. A liquid ejection device comprising:
the liquid ejection head according to claim 8; and
a moving unit configured to move the liquid ejection head and a recording medium relative to each other.

* * * * *